(12) United States Patent
Hartman et al.

(10) Patent No.: US 6,380,852 B1
(45) Date of Patent: Apr. 30, 2002

(54) POWER SHUT-OFF THAT OPERATES IN RESPONSE TO PRESPECIFIED REMOTE-CONDITIONS

(75) Inventors: Michael G. Hartman, Kirkland; Jesse A. Dosher, Seattle, both of WA (US)

(73) Assignee: Quietech LLC, Kirkland, WA (US)

( * ) Notice: Subject to any disclaimer, the term of this patent is extended or adjusted under 35 U.S.C. 154(b) by 0 days.

(21) Appl. No.: 09/432,850

(22) Filed: Nov. 2, 1999

(51) Int. Cl.[7] .............................. G08B 19/00; G08B 1/08
(52) U.S. Cl. .................... 340/521; 340/538; 340/539; 340/310.08; 307/116; 307/140
(58) Field of Search ................................. 340/521, 539, 340/825.72, 825.69, 310.01, 310.06, 310.08, 538; 307/140, 116

(56) References Cited

U.S. PATENT DOCUMENTS

| 3,925,763 A | * | 12/1975 | Wadhwani et al. | 340/539 |
|---|---|---|---|---|
| 4,206,444 A | | 6/1980 | Ferlan | 340/147 R |
| 4,389,543 A | | 6/1983 | Granirer et al. | 179/2 B |
| 4,446,454 A | * | 5/1984 | Pyle | 340/538 |
| 4,467,144 A | | 8/1984 | Wilkerson et al. | 179/84 R |
| 4,647,721 A | | 3/1987 | Busam et al. | 379/102 |
| 4,723,269 A | | 2/1988 | Summerlin | 379/102 |
| 5,081,667 A | * | 1/1992 | Drori et al. | 340/426 |
| 5,101,191 A | * | 3/1992 | MacFadyen et al. | 340/310.06 |
| 5,198,806 A | | 3/1993 | Lord | 340/825.31 |
| 5,379,341 A | | 1/1995 | Wan | 379/102 |
| 5,424,587 A | | 6/1995 | Federowicz | 307/140 |
| 5,471,190 A | * | 11/1995 | Zimmermann | 340/310.01 |
| 5,493,618 A | * | 2/1996 | Stevens et al. | 381/110 |
| 5,508,568 A | * | 4/1996 | Mammen | 307/117 |
| 5,729,596 A | | 3/1998 | Reeder et al. | 379/102.04 |
| 5,809,118 A | | 9/1998 | Carmello et al. | 379/102.02 |
| 5,838,776 A | | 11/1998 | Adkins et al. | 379/102.05 |
| 5,861,799 A | * | 1/1999 | Szwed | 340/425.5 |
| 5,872,832 A | | 2/1999 | Bishel et al. | 379/39 |
| 5,917,405 A | * | 6/1999 | Joao | 340/426 |
| 6,005,476 A | * | 12/1999 | Valiulis | 340/310.01 |

* cited by examiner

Primary Examiner—Donnie L. Crosland
(74) Attorney, Agent, or Firm—Gary C Conn PLLC

(57) ABSTRACT

Apparatus and a method for temporarily disabling the operation of a noise-producing electrical device or internal combustion engine upon detection of a predetermined awareness condition, such as an incoming telephone call, doorbell ring, security system alarm or other awareness condition. For disabling operation of an electrical device, the apparatus includes a command module and one or more switchable power receptacles that respond to a control signal from the command module, de-energizing the electrical device, when at least one of the predetermined awareness conditions is detected. Control signals are communicated to the switchable power receptacles via either a radio frequency signal, or by a modulated signal that is conveyed over an alternating current electrical power circuit to which the command module and switched power receptacle(s) are connected. For disabling operation of an engine, the apparatus includes a command module that sends a wireless signal to a shutdown module to control operation of the engines ignition or fuel systems, so that operation of the engine is disabled when the shutdown module is switched to a shutdown mode. Disabling operation of a noise-producing device enables a signal that is produced in conjunction with the awareness condition, such as a telephone or doorbell ring, to be more easily perceived.

23 Claims, 16 Drawing Sheets

POWER SHUT-OFF THAT OPERATES IN RESPONSE TO PRESPECIFIED REMOTE-CONDITIONS

STATEMENT REGARDING FEDERALLY SPONSORED RESEARCH OR DEVELOPMENT

The research and development leading to the subject matter disclosed herein was not federally sponsored.

BACKGROUND OF THE INVENTION

This invention generally relates to a control that de-energizes a device in response to an external signal so that the user can sense the signal.

An occupant of a building often wants or needs to become aware if certain conditions exist. A simple and obvious example of such a condition is an incoming telephone call. However, there are many other such conditions, of which the ringing of a doorbell, the sound of smoke or fire alarms, the activation of a security system and the sound or movement of small children or intruders are just a few.

The existence of these conditions can be missed for any of many reasons. For example, just about everyone has missed a telephone call at one time or another because extraneous environmental noise prevented the phone's ring from being heard. Noise generated by the operation of common household appliances such hair dryers, vacuum cleaners, carpet shampooing machines, food mixers, blenders, etc. often prevents a phone ring from being heard by someone in the vicinity of the appliance. Power equipment such as grinders, saws, sanders, shop vacuums, etc. are the typical culprits when a phone ring can't be heard in a garage or workshop.

Similarly, the condition could be missed because the occupant is simply too far away or preoccupied to sense it. For example, a person may be in a remote portion or outside of a building where a doorbell, telephone ring or baby's cry cannot be heard. In some instances, the apparatus that produces the condition may be temporarily disabled, as is the case in which a telephone ringer is muted so as to prevent disturbing a specific occupant of a building.

Thus, there are many instances in which it would be desirable to provide an alternative means by which the existence of certain conditions could be brought to the attention of an occupant of a building.

One way to avoid such problems is to provide some sort of supplemental cue. For example, a technique that is commonly used to indicate the occurrence of an incoming telephone call in noisy environments (and in home and work areas where people who do not hear well are present) is to provide a supplemental visual cue such as a flashing light. While this approach is well suited for many applications, it is not a practical solution for many home and shop environments because a person's attention may be directed away from the visual cue. For example, when working with a power tool in a shop, the operator's visual attention will likely be focused on the tool and away from any visual light signal. Moreover, systems that provide supplemental visual cues tend to be inflexible, in the sense that the visual cue is both specific to a unique condition and limited to a specific location (i.e., the immediate vicinity of the light that provides the visual cue). For example, an annunciator light for a telephone is usually incorporated into the telephone set. Thus, the supplementary visual cue is not easily adapted to respond to more than one specific condition or to provide a supplementary cue at more than one specific location.

It would be desirable to provide an inexpensive, versatile and effective means by which the existence of certain predetermined conditions can be brought to the attention of an occupant of a building or surrounding property.

SUMMARY OF THE INVENTION

In one aspect, this invention is an apparatus comprising
(a) a transmitter for sending a signal directly or indirectly to a switchable power receptacle in response to the occurrence of a predetermined awareness condition, said transmitter including at least one of (i) sensing means for sensing the occurrence of at least one predetermined awareness condition or (ii) input means for receiving an input from such a sensing means and
(b) at least one remote switchable power receptacle that includes (i) outlet means for receiving an electrical supply line for an electrically powered device, (ii) connection means for connecting said receptacle to an electrical power supply, said connection means being in electrical communication with said outlet means though (iii) switch means having an "on" and "off" position such that electrical power is supplied to said outlet means when said switch is in an "on" position and electrical power to said outlet means is interrupted when said switch is in an "off" position, and (iv) receiving means for receiving said signal directly or indirectly from said transmitter and operating said switch in response to said signal.

In a second aspect, this invention is a switchable power receptacle that operates in response to a signal from a remote transmitter that indicates the existence of an awareness condition, the receptacle comprising (i) outlet means for receiving an electrical supply line for an electrically powered device, (ii) connection means for connecting said receptacle to an electrical power supply, said connection means being in electrical communication with said outlet means though (iii) switch means having an "on" and "off" position such that electrical power is supplied to said outlet means when said switch is in an "on" position and electrical power to said outlet means is interrupted when said switch is in an "off" position, and (iv) receiving means for receiving a signal directly or indirectly from said transmitter and operating said switch in response to said signal.

The invention of the first two aspects operates by detecting one or more prespecified conditions, communicating to the switchable power receptacle that such a condition has occurred and, in response, switching the power receptacle to an "off" position. This interrupts power to any electrical device that is plugged into the power receptacle.

Thus, in another aspect, this invention is a method that comprises (1) detecting the occurrence of a predetermined awareness condition, (2) transmitting a signal to a switchable power receptacle in response to the occurrence of the predetermined awareness condition and (3) interrupting power supplied through said switchable power receptacle to an electrically powered device attached to the switchable power receptacle in response to the signal.

The interruption of power to an electrical device plugged into the power receptacle will of course deactivate the device. This deactivation provides a supplementary cue indicating the existence of an awareness condition, although if the power receptacle is capable of being switched off in response to more than one awareness condition, the deactivation may not directly identify which of several possible awareness conditions has occurred. However, in many cases, deactivating the electrical device has the effect of eliminating noise or other stimuli the device creates, enabling one to perceive and identify the awareness condition directly. A common example of this is the case where the awareness condition is a ringing telephone. Deactivation of a noisy electrical device will often enable the ring to be heard and identified. In other embodiments, the switchable power receptacle and/or transmitter can contain optional components that permit direct identification of the particular awareness condition, as described more fully below.

This invention provides other significant advantages. The switchable power receptacle can be designed to replace common household and office electrical receptacles. It can take the form of an adapter through which the power line of an electrical device is connected with an ordinary electrical receptacle. In either embodiment, the switchable power receptacle is readily located where its benefits are desired. Multiple switchable power receptacles can be used so that the occurrence of the awareness condition can be indicated at multiple locations within or without a building. In these preferred embodiments, the invention can be used in conjunction with a large variety of electrical devices, because the electrical device will not need modification or special circuitry to be deactivated in response to the occurrence of an awareness condition.

In a fourth aspect, this invention is an apparatus for shutting down an internal combustion engine upon detection of a predetermined awareness condition, wherein the internal combustion engine includes an ignition system and a fuel-supply system, comprising:

(a) a transmitter for sending a signal directly or indirectly to a switchable power receptacle in response to the occurrence of said predetermined awareness condition, said transmitter including at least one of (i) sensing means for sensing the occurrence of at least one predetermined awareness condition and (ii) input means for receiving an input from such a sensing means and (b) a shutdown module comprising (1)(a) a switch that is coupled to said ignition system and/or (1)(b) a valve that controls a flow of fuel for the said internal combustion engine, said shutdown module being switchable between a normal operation mode and a shutdown mode in which operation of the internal combustion engine is disabled, by actuating said one of the switch and the valve; and (2) receiving means for receiving said signal directly or indirectly from said transmitter and operating said switch or valve to effect said shutdown mode in response to said signal.

This fourth aspect of the invention permits the deactivation of an internal combustion engine in response to a predetermined awareness condition. A fifth aspect of the invention is a method that comprises (1) detecting the occurrence of a predetermined awareness condition, (2) transmitting a signal to a shutdown module on an internal combustion engine in response to the occurrence of the predetermined awareness condition, (3) operating at least one of 1)(a) a switch that is coupled to said ignition system and/or (1)(b) a valve that controls a flow of fuel for the said internal combustion engine to stop the internal combustion engine in response to said transmitted signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings.

DETAILED DESCRIPTION OF THE INVENTION

Figure 1:
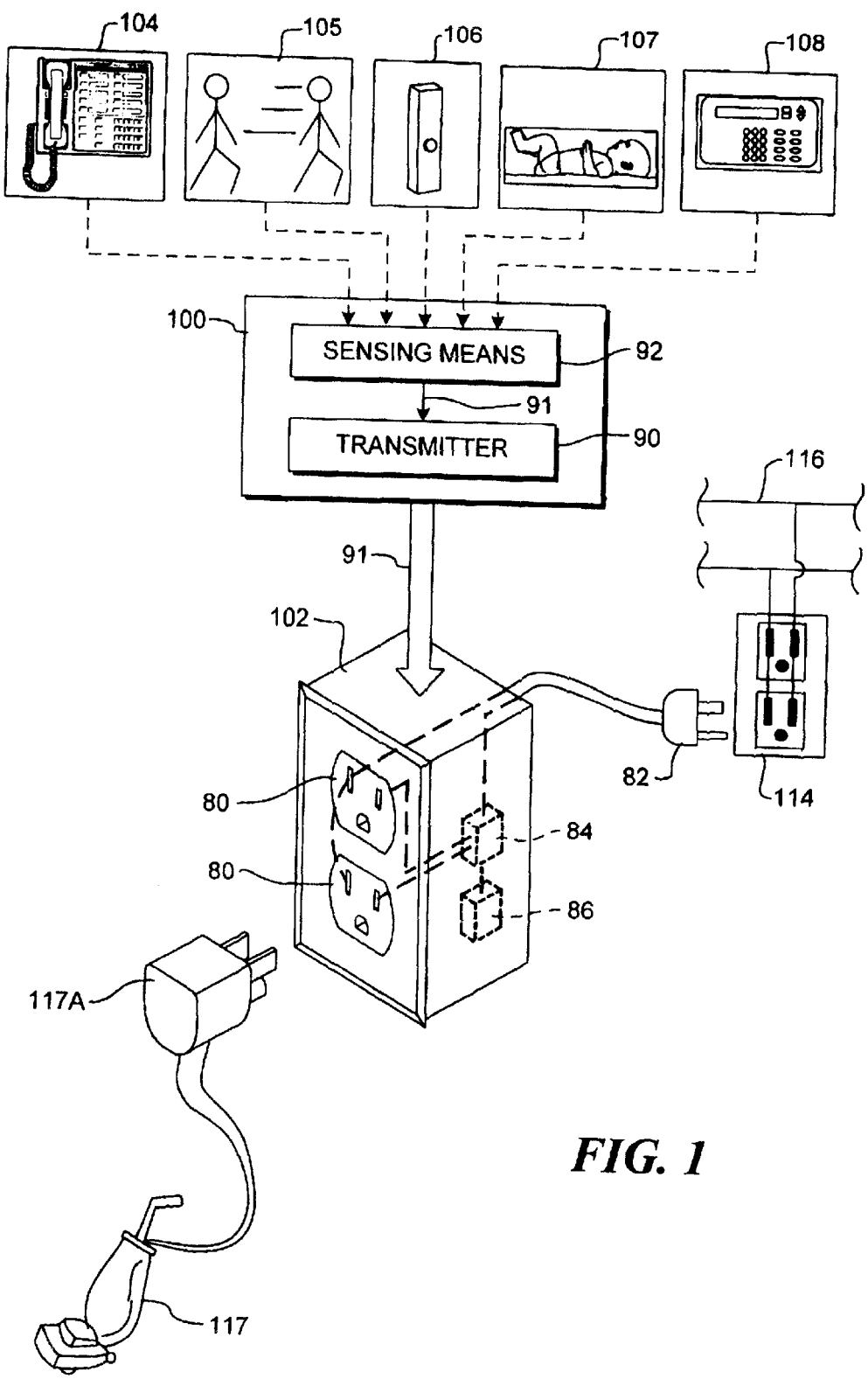
FIG. 1 is a block diagram illustrating an overview of the operation of the present invention.

An overview of how the invention operates is provided by FIG. 1. In FIG. 1 are shown module 100 and switchable power receptacle 102. As shown in FIG. 1, switchable power receptacle 102 takes the form of an adapter that plugs into an ordinary wall outlet 114. Switchable power receptacle 102 includes outlet means 80 for receiving an electrical supply line 117A of an electrically powered device 117 (represented in FIG. 1 as a vacuum cleaner). Switchable power receptacle 102 also includes connection means 82 (as shown, an ordinary electrical plug having male terminals) for connecting said receptacle to AC power circuit 116 through wall receptacle 114. Connection means 82 is in electrical communication with outlet means 80 though switch means 84. Switch means 84 has "on" and "off" positions such that electrical power is supplied to outlet means 80 when switch means 84 is in an "on" position and electrical power to outlet means 80 is interrupted when switch means 84 is in an "off" position. Receiving means 86 communicates with switch means 84 and is adapted to receive a signal transmitted from transmitter 90 of module 100. When switching means 84 is in the "on" position, electrical power is provided from AC power circuit 116 through wall receptacle 114 and switchable power receptacle 102 to electrically powered device 117. Conversely, when the internal switching means is in the "off" position, the electrical power to electrically powered device 117 is terminated.

Module 100 includes one or more sensing means 92 that are capable of sensing one or more predetermined awareness conditions. In FIG. 1, the awareness conditions are represented by telephone 104, moving object 105, doorbell 106, voice 107 and silent alarm system 108. The dotted lines connecting telephone 104, moving object 105, doorbell 106, voice 107 and silent alarm system 108 to module 100 respectively represent the ability of sensing means 92 to sense that one or more of certain predetermined conditions exist, as is discussed in more detail below. Module 100 contains transmitter 90 for transmitting a signal to switchable power receptacle 102 when sensing means 92 detects the existence of an awareness condition.

Although shown in FIG. 1 as discrete components combined into a single unit, sensing means 92 and transmitter 90 may be integrated into a single component or integrated into other, optional components. They may also be housed separately as discussed more below. Similarly, switch means 84 and receiving means 86 may be integrated with each other and/or other optional components. As discussed below, additional components may be included in the transmitter and in the switchable power receptacle.

When transmitter 90 is housed separately from the sensing means 92, transmitter 90 includes means for receiving an input from sensing means 92. A wire connection or any of the transmission/receiving systems discussed below can be used to provide an input from a remote sensing means 92 to transmitter 90.

Sensing means 92 may be of many types depending on the particular kind of preselected awareness condition to be monitored. Suitable sensing means include sound detectors (such as a microphone), motion detectors, light detectors, radio frequency detectors, heat detectors, smoke detectors and the like. The sensing means may also be a device (such as a load detector, voltage detector, current detector or, in the case of a telephone, a ring detector) for detecting the operation of another electrical device or component thereof. Thus, for example, the sensing means may be an electrical circuit that detects the operation of a doorbell, alarm system, etc., or an incoming wireless telephone ring signal. Module 100 may contain or accept inputs from more than one sensing means 92, in order to detect more than one type of awareness condition. Of course, multiple sensing means can be integrated into a single component. Detectors of all the above types are well known and do not need further description.

Transmitter 90 can be any apparatus that transmits a signal to the switchable power receptacle when the sensing means detects the existence of an awareness condition. Suitable transmitters include a RF (radio frequency) transmitter, an AC line power carrier transceiver, ultrasound transmitter, infrared or visible light transmitter, microwave transmitter, and the like.

Sensing means 92 and transmitter 90 of module 100 are in communication (as represented by arrow 91) so that upon detection of an awareness condition by sensing means 92, transmitter 90 is activated to transmit a signal to switchable power receptacle 102.

Outlet means 80 is most typically a female receptacle for receiving the male terminals of power line 117a of electrically powered device 117. Thus, outlet means 80 may take the form of a common AC power socket. Outlet means 80 advantageously is a socket including at least a line and neutral (or positive and negative) terminal and preferably contains a ground terminal as well (as shown in FIG. 1). Outlet means may 80 include one or more of such sockets. Alternatively but less preferably, outlet means 80 may comprise a set of screw terminals, push-in terminals, soldering pads or other terminals through which an electrically powered device 117 can be connected to switchable power receptacle 102.

Connection means 82 is advantageously (1) a set of male terminals including at least line and neutral (or positive and negative) male terminals and preferably a ground terminal as well (as shown in FIG. 1) or (2) a set of screw terminals, push-in terminals, solder pads or other terminals through which switchable power receptacle 102 can be wired to an electrical power supply.

Switch means 84 can be of any design that can be actuated from an "on" configuration to an "off" configuration in response to a signal transmitted directly or indirectly from transmitter 90. Relays, junction field effect transistors, silicon controlled rectifiers and the like are all useful switch means.

Receiving means 86 is of course selected in conjunction with transmitter 90 and is adapted to detect the signal from transmitter 90 and operate switch means 84 when the signal is so detected. Thus, receiving means 86 can be, for example, an RF (radio frequency) receiver, an AC line power carrier transceiver, ultrasound receiver, infrared or visible light receiver, microwave receiver, and the like. Although shown in FIG. 1 as separate components, receiving means 86 and switch means can be integrated with each other and/or with other, optional components of switchable power receptacle 102.

In preferred embodiments, the transmitter contains a power supply, draws power from a device it is monitoring or contains a means for connecting to an electrical power supply such as an AC power circuit. It will often contain an AC-to-DC converter that supplies a DC current to its internal components. The switchable power receptacle may contain its own power supply, but most often will draw power from the power source to which it is connected, converting it from AC to DC if necessary.

It is highly preferred that the switchable power receptacle and the transmitter are separately housed components that can be located at arbitrary, remote positions with respect to each other (subject to the range of the signal that is sent by the transmitter to the switchable power receptacle).

Having described the invention generally, various exemplary embodiments will now be described in more detail, beginning with a more detailed description of the switchable power receptacle.

Figure 2A:
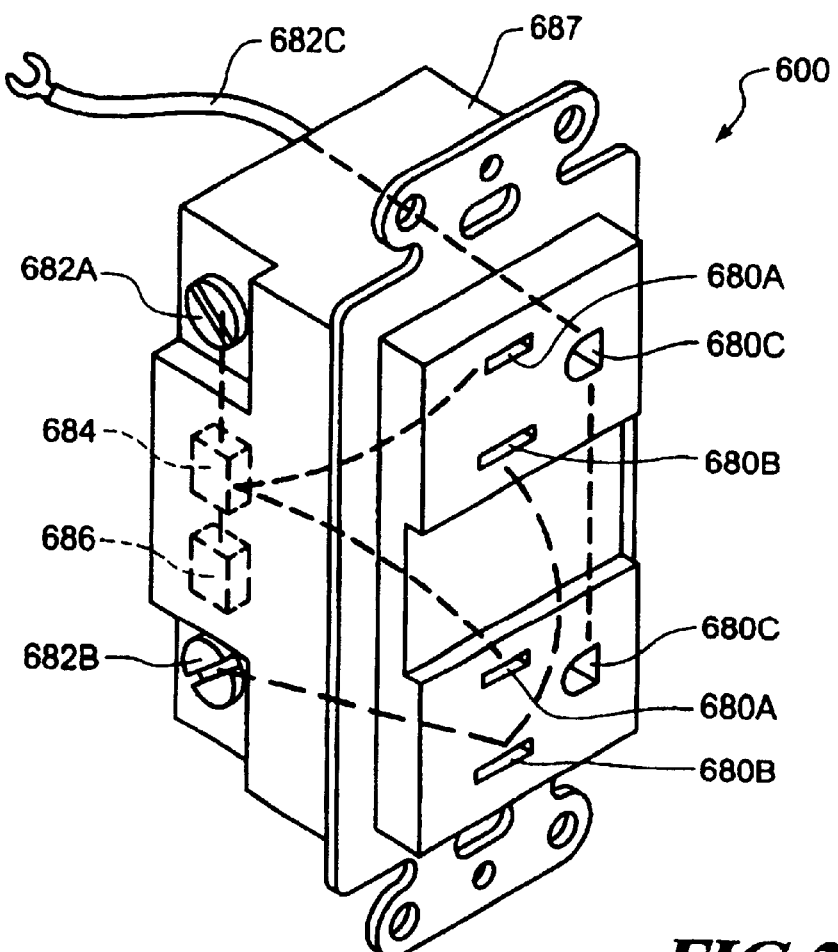
FIGS. 2A, 2B are views in partial section of various embodiments of switchable power receptacles of the invention.
Figure 2B:
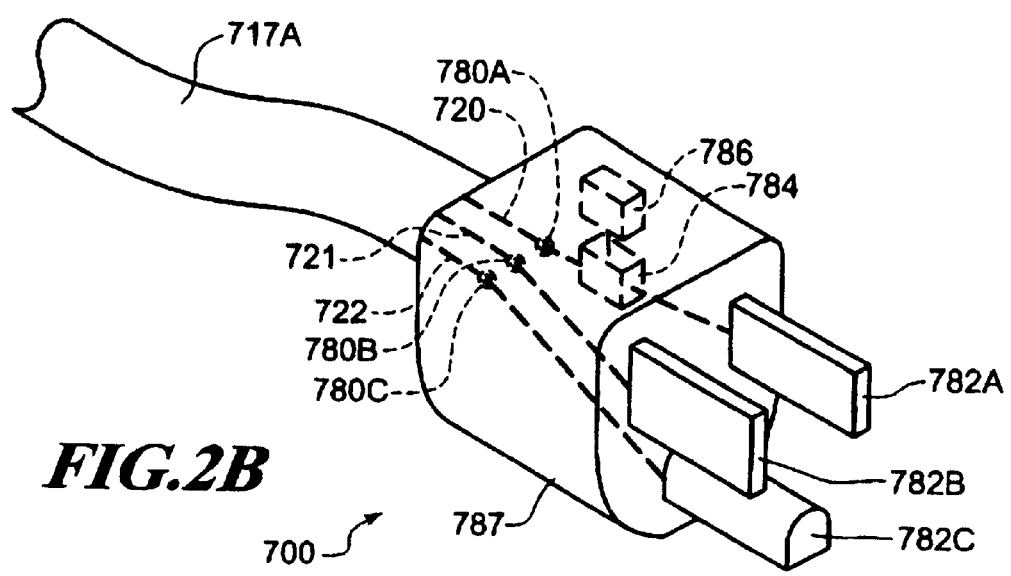

FIGS. 2A and 2B illustrate two additional variations of the switchable power receptacle. The embodiment shown in FIG. 2A is adapted to replace a common AC wall receptacle. Switchable power receptacle 600 has female terminals 680A, 680B and 680C which are adapted to receive the male terminals of a common electrical plug. Screws 682A and 682B are connections to the line and neutral terminals, respectively, of an AC power circuit. Female terminals 680B and 680C are in electrical connection with screw terminal 682B and ground wire 682C, respectively. Switch means 684 is disposed between screw terminal 682A and female terminals 680A, so that power to female terminal 680A is disengaged when switch means 684 operates in response to a signal transmitted from a transmitter and received by receiving means 686. Receiving means 686 is contained in housing 687. When a signal from a transmitter is received by receiving means 686, switch means 684 is activated, breaking the flow of current to female terminals 680A, thereby disengaging any electrically powered device that is plugged into switchable power receptacle 600.

As shown in FIG. 2B, switchable power receptacle 700 is incorporated into an electrical plug at the terminus of a power line for an electrically powered device. In this embodiment, the outlet means are connection pads 780A, 780B and 780C, to which line, neutral and ground wires 720, 721 and 722 of power line 717A are soldered or otherwise attached. Male terminals 782A, 782B and 782C comprise the connection means. Switch means 784 and receiving means 786 are contained in housing 787 and perform the functions described above. Although useful, this embodiment has the disadvantage of being permanently affixed to a particular electrically powered device, and thus lacks some of the flexibility of the embodiments shown in FIGS. 1 and 2A.

Exemplary circuitry for use in the switch means and the receiving means is illustrated in FIGS. 3, 4A, 4B and 5.

Figure 3:
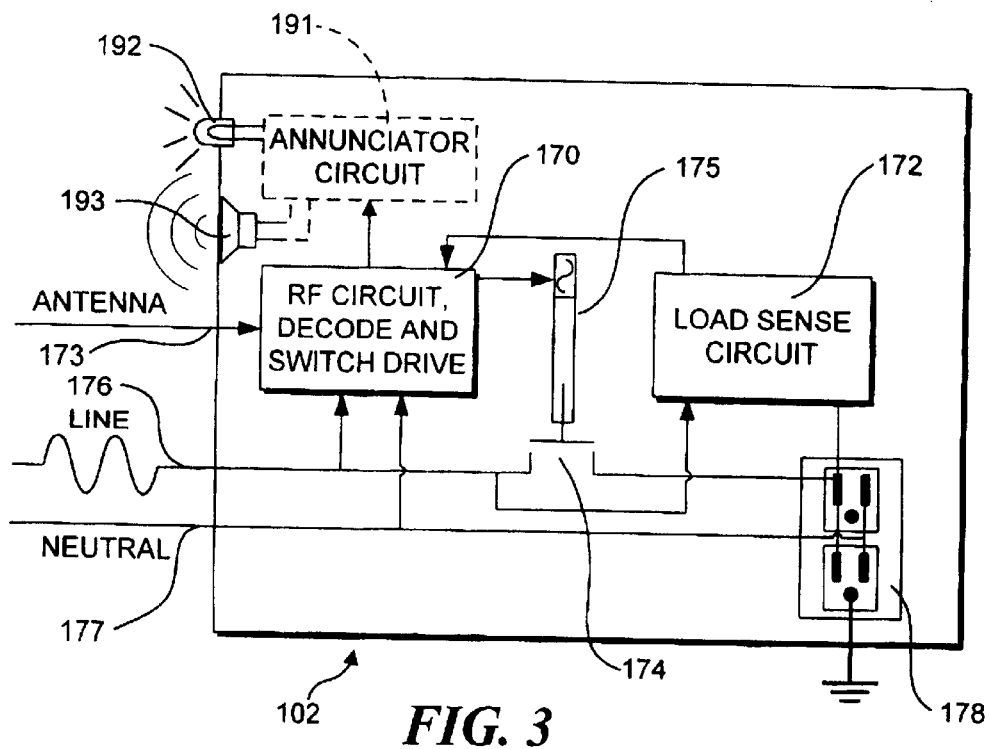
FIG. 3 is a schematic block diagram of the electronic circuit used in the switchable power receptacle of the first exemplary embodiment.

As shown in FIG. 3, switchable power receptacle 102 includes a RF circuit including a microcontroller programmed with decode logic and switch drive circuitry identified by a block 170 and an optional load sense circuit 172. RF circuit 170 receives a signal from the transmitter via antenna line 173 and contains switch drive circuitry that actuates switch contacts 174 in a relay 175. Switch contacts 174 connect an AC line 176 to the line contacts of outlet 178, while a neutral input 177 is passed through to the neutral terminals of outlet 178. Outlet 178 preferably comprises one to four or more conventional female AC line power sockets, each including line, neutral and optionally ground terminals. When switch contacts 174 are closed, AC line voltage is supplied to the line terminals of the outlet 178.

Preferred switchable power receptacles are designed so that once the switch means is actuated to an "off" position, some affirmative step must be performed in order to re-energize the receptacle. In the embodiment shown in FIG. 3, this function is performed by load sense current 172. Load sense circuit 172 detects whether an electrical load is connected across the line and neutral terminals of outlet 178. Detection of the awareness condition by a sensing means causes a signal to be transmitted to and received by RF circuit 170, which in turn sends a signal to relay 175 that operates to cause switch contacts 174 to open, thereby interrupting AC power to the device that is energized through outlet 178 and terminating operation of the device. Relay 175 is preferably of a non-momentary type, i.e., once it opens contacts 174, it keeps contacts 174 open until it receives a further instruction to close them, or vice versa. The microcontroller is preferably programmed to send a signal to close contacts 175 only upon some action by the user, such as resetting the switch or shutting off the electrical device connected to the switchable power receptacle. Load sense circuit 172 is used to ensure that the device is not unexpectedly energized, by preventing switch contacts 174 from being closed while there is an electrical load connected to outlet 178. A load will be detected until the user manually switches the power switch on the device to an off position, toggles the power switch off and on, or unplugs the device. Until the power switch on the device is switched off, toggled or the device is unplugged, load sense circuit 172 will prevent switch contacts 174 from closing.

Instead of a load sense circuit, the switchable power receptacle may be equipped with a reset button, sound activated switch or similar apparatus so that the receptacle can be reactivated through some action upon the receptacle itself.

Figure 4A:
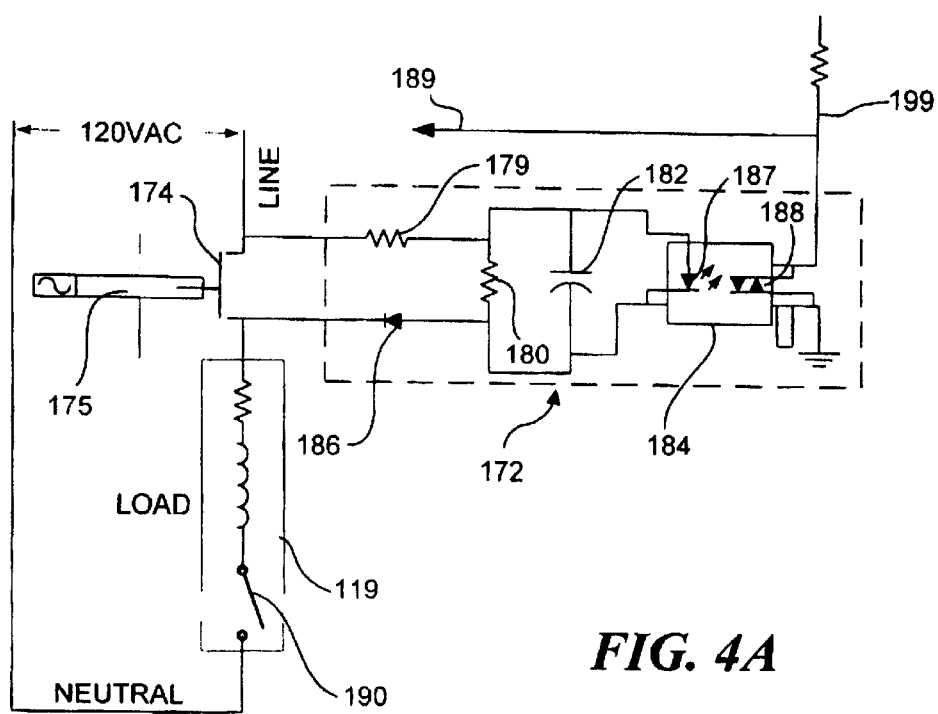
FIG. 4A is a detailed schematic diagram of a load sense circuit used for detecting the presence of an electrical load connected to a switchable power receptacle.

The operation of the load sense circuit is shown in more detail in FIG. 4A. In FIG. 4A, load sense circuit 172 responds to a small current passing through load 119 (i.e., the electrically powered device) that is connected to outlet 178 (see FIG. 3) once the relay opens switch contacts 174. Load sense circuit 172 includes a current limiting resistor 179 and a resistor 180 that is connected in parallel with three components, including a capacitor 182, an opto-isolator 184, and a power diode 186. When switch contacts 174 are open, current flows through LED 187 in opto isolator 184, causing a photodiode pair 188 to conduct, which causes a control signal on lead 189 to be pulled to ground (i.e., switched to a low logic level). Leads 189 is connected to the microcontroller in RF circuit, decode and switch drive 170 of FIG. 3. Lead 199 is connected to a power supply for the load sense circuit. Note that if power switch 190 in load 119 is open, no current will flow through LED 187 and the control voltage in lead 189 will remain at the circuit's logic level high state. When switch contacts 174 are closed, there is no voltage differential across the input lines to load sense circuit 172, which causes the circuit to produce a logic level high output signal.

Returning to FIG. 3, switchable power receptacle 102 may optionally include an annunciator circuit 191, which produces a supplementary visual and/or audible cue to alert the user that a corresponding awareness condition has been detected. For instance, since a silent alarm cannot be heard, it is preferable to provide an indication that the silent alarm has been tripped. Such an indication can be provided by flashing a light-emitting diode (LED) 192 (or other type of light source) disposed on an external portion of switchable power receptacle 102 that is readily visible. Alternatively an audible warning can be provided through the use of an alarm signal from a speaker or buzzer 193, which is preferably mounted to an exterior surface of the switchable power receptacle's housing and produces a clearly audible sound that can be heard by the user after the electrically powered device has been de-energized.

Figure 4B:
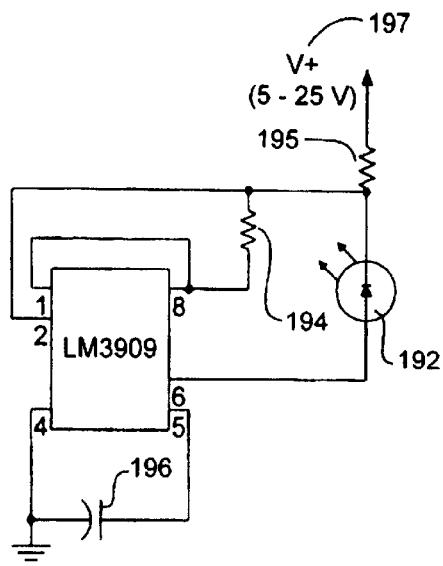
FIG. 4B is a detailed schematic diagram of a flashing circuit used for providing a visual indication that an awareness condition has been detected.

An exemplary flashing circuit is shown in FIG. 4B. It includes a National Semiconductor Corporation, type LM3909 LED flasher/oscillator integrated circuit (IC), resistors 194 and 195, a capacitor 196, and LED 192. The LM3909 IC provides an internal path between pins 6 and 4 that is switched on and off at a frequency determined as a function of the RC circuit formed by resistor 194 and capacitor 196, thereby enabling electrical current to periodically flow through LED 192 at this frequency. In a preferred operation, the flashing circuit will be activated to provide a flashing warning whenever switchable power receptacle 102 receives a signal to switch off the power supplied to the electrically powered device. The flasher circuit is energized by simply connecting the flashing circuit to a positive supply voltage 197 through a transistor or other solid-state switch. Preferably, supply voltage 197 is removed whenever power is available at outlet 178 to energize the electrically powered device, such that the flashing warning ceases when the switchable power receptacle is re-energized. In addition to flashing LED 192, it is envisioned that a plurality of LEDs could be used to indicate each of a corresponding number of different awareness conditions. For instance, a flashing (or steady) green LED could be used to indicate an incoming telephone call is being received, while a flashing (or steady) red LED could be used to indicate an occurrence of a more serious awareness condition, such as a silent alarm.

In some situations it may be preferable to provide an audible warning in place of or in addition to the visual enunciation. In these instances, the audible warning preferably will comprise a synthesized verbal warning corresponding to the detected awareness condition, such as "the silent alarm has been tripped" or "forced entry detected," etc. Such verbal warnings can be readily produced by using dedicated speech synthesis circuit components designed for this purpose, including those available from the Elan Microelectronic Corporation, such as the Models EM20055A or EM200353 single-chip voice synthesizer ICs.

It is also preferable that the audible warning should only be annunciated at switchable power receptacles that were in use prior to being de-energized, so as to avoid defeating the original purpose of the silent alarm (i.e., by providing an audible warning to the intruder or burglar). This goal can be accomplished by monitoring the load sense circuit and controlling the audible warning in response thereto, so that an audible warning is provided only if a load is determined to have been energized by outlet 178 prior to de-energizing the switchable power receptacle that includes the outlet.

Figure 5:
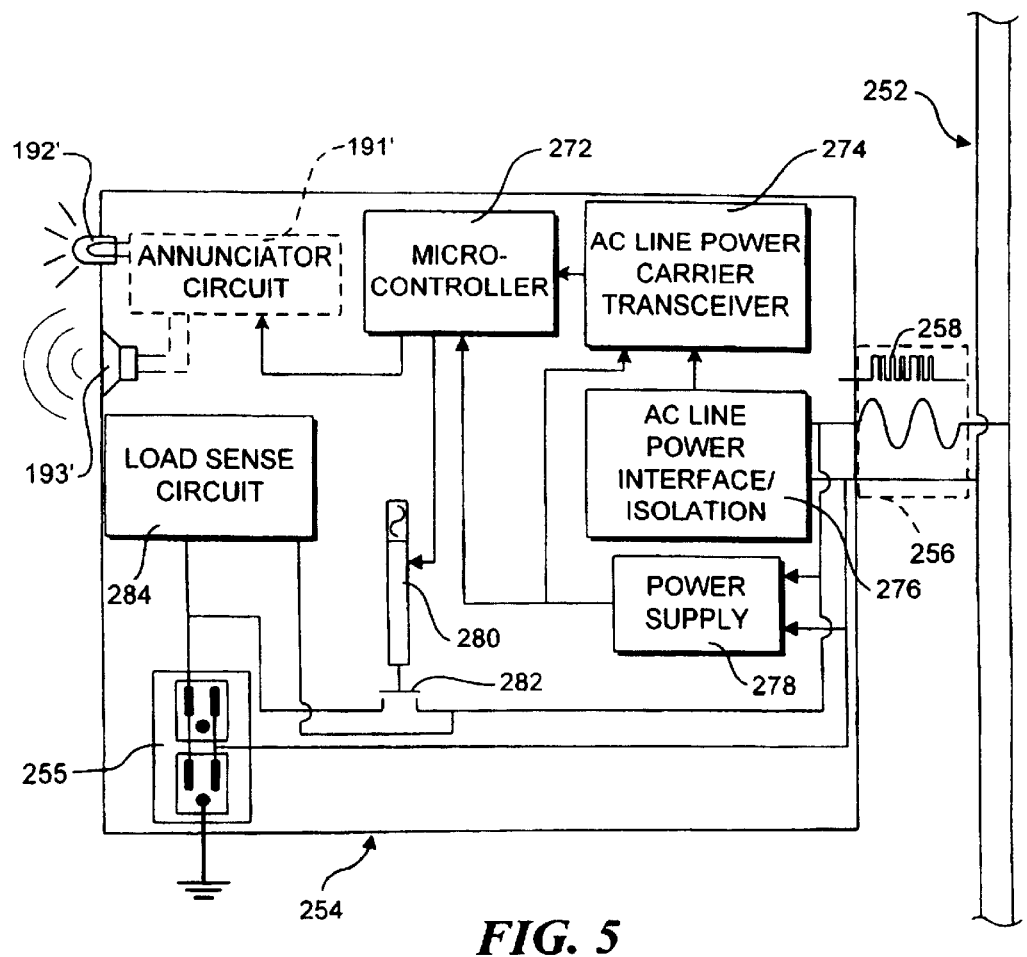
FIG. 5 is a schematic block diagram illustrating circuitry of an embodiment switchable power receptacle of the invention with a power line modem.

FIG. 5 shows circuitry for a second embodiment of a switchable power receptacle. Switchable power receptacle 254 comprises a microcontroller 272 and an AC line power carrier transceiver 274, each of which is energized by a power supply 278 that is connected to the AC voltage supplied from outlet 256.

Switchable power receptacle 254 also includes a power line interface/isolation circuit 276, which is used to isolate the high voltages (i.e., 120 volts AC) on AC power circuit 252 from the internal circuitry of switchable power receptacle 254. AC line power carrier transceiver 274 preferably includes a power line modem such as an SGS-Thompson ST7537 CFN power line modem, which is used as a receiving component for demodulating modulated signal 258 which is transmitted to switchable power receptacle 254 over AC power lines 252. AC line power carrier transceiver 274 is able to filter out the 60 Hz AC power portion of the waveform input to it, thereby isolating modulated signal 258 from the AC power portion. AC line power carrier transceiver 274 further contains logic for demodulating the modulated signal, producing a binary bit stream that is input to microcontroller 272. Microcontroller 272 commands a relay 280 to open or close a set of contacts 282 that interrupt the AC line in response to input signal that microcontroller 272 receives from AC line power carrier transceiver 274. Relay 280 is preferably a non-momentary type, as described before. Thus, microcontroller 272 interrupts power to an electrically powered device connected to outlet means 255 of switchable power receptacle 254 upon receiving an appropriate command signal from a transmitter.

Switchable power receptacle 254 additionally includes an optional but preferred load sense circuit 284 that performs the same function as described above with regard to FIG. 3. In addition, the switchable power receptacle may also include an annunciator circuit 191', which is used to produce a visual or audible warning through use of an LED 192' and/or a speaker 193' in a manner similar to that discussed above.

Figure 6:
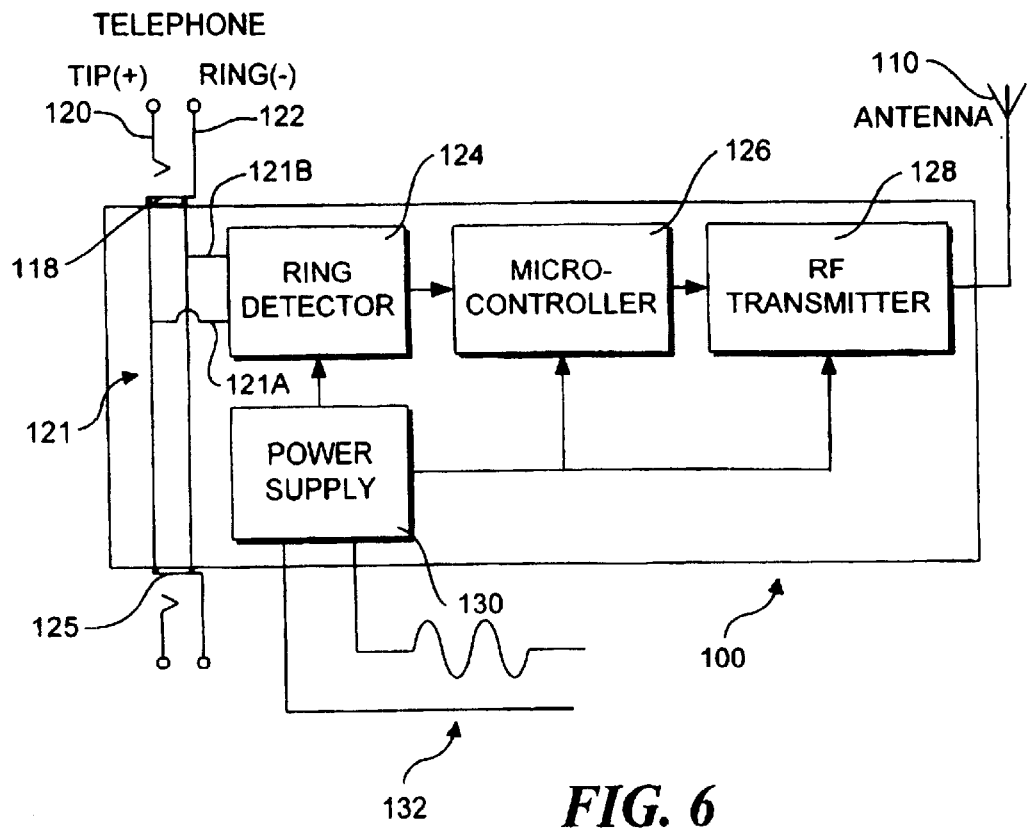
FIG. 6 is a schematic block diagram of the electronic circuitry used in a module of the first exemplary embodiment.

An example of a transmitter adapted for detecting an incoming telephone call is illustrated in FIG. 6. The embodiment shown in FIG. 6 is adapted to work with a switchable power receptacle of the type shown in FIG. 3. Module 100 detects the ring of a telephone by examining the differential voltage across a tip line 120 and a ring line 122 of a telephone line. A telephone jack 118 is mounted on module 100 to connect to the ring line and tip line. Module 100 includes a ring detector 124, which is in electrical connection with tip line 120 and ring line 122 through internal wiring 121, 121A and 121B. Ring detector 124 monitors the voltage on the telephone line to detect the ringing signal, which typically (in the U.S.) is a 70–110 volt Ac signal, at 20 Hz. In the embodiment shown, ring detector 124 is adapted to work with microcontroller 126 to activate RF transmitter 128. As shown, ring detector 124 produces a logic level signal that is supplied as an input to microcontroller 126 such that the logic level of this signal changes when a ringing signal is detected. Upon determining that a ringing signal has been, microcontroller 126 provides a control signal to RF transmitter 128, causing it to transmit a signal via antenna 110.

In the embodiment shown in FIG. 6, ring detector 124, microcontroller 126 and RF transmitter 128 are energized from a power supply 130 that receives power over an AC line 132 and produces direct current (DC) at one or more output voltages as required by the various circuit components. Alternatively, any power required by ring detector 124, microcontroller 126, RF transmitter 128 or other components as may be present can be supplied by a DC power supply, such as a battery, or, less preferably, from the telephone line.

Module 100 of FIG. 6 contains several optional but preferred components. Microcontroller 126 can be eliminated, with ring detector 124 being adapted to provide a signal which, with or without amplification, is sent to RF transmitter 128, which then generates a radio frequency signal and transmits it to a switchable power receptacle. Also shown in FIG. 6 is a second telephone jack 128, which is connected to telephone jack 118 through internal wiring 121, thereby providing a pass-through for the telephone line signals to connect to a telephone set. This permits a telephone to be connected to the telephone line through module 100. Although not shown in FIG. 6, the telephone jacks and internal wiring can additionally provide for passing through the other two wires of a four-wire telephone line in the event that a four-wire line is used.

When a RF transmitter is used, the frequency is usually selected to comply with governmental requirements. In the United States, the Federal Communication Commission (FCC) establishes permitted frequencies.

Of course, other types of transmitters can be substituted for the RF transmitter shown in FIG. 6.

Figure 7:
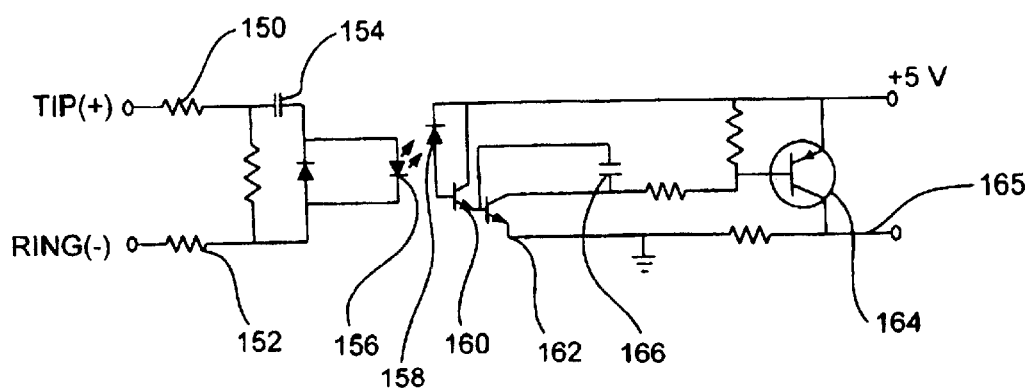
FIG. 7 is a detailed schematic diagram of a ring detection circuit used by an embodiment of the present invention to detect the occurrence of an incoming telephone call.

FIG. 7 shows an exemplary ring detector circuit for detecting a typical telephone ring signal. When this ringing signal is present on the telephone line, a current, which is limited by resistors 150 and 152 and is coupled through a capacitor 154, causes an infrared light emitting diode (LED) 156 to turn on. When the infrared light from LED is 156 sensed by photodiode 158, photodiode 158 conducts a small amount of current. NPN transistor 160 amplifies this current, producing an output signal that is coupled to the base of second NPN transistor 162 that has an emitter coupled to ground. PNP bipolar transistor amplifier 164 provides a final stage of amplification, pulling a ring detect output line 165 high. Capacitor 166 filters the pulses of AC on the ringing signal so that the ring detect output signal makes a clean transition to a logic level high. This circuit thus produces a logic level high signal when the phone is ringing, but does not draw enough current from the telephone line to terminate the ringing signal.

Figure 8:
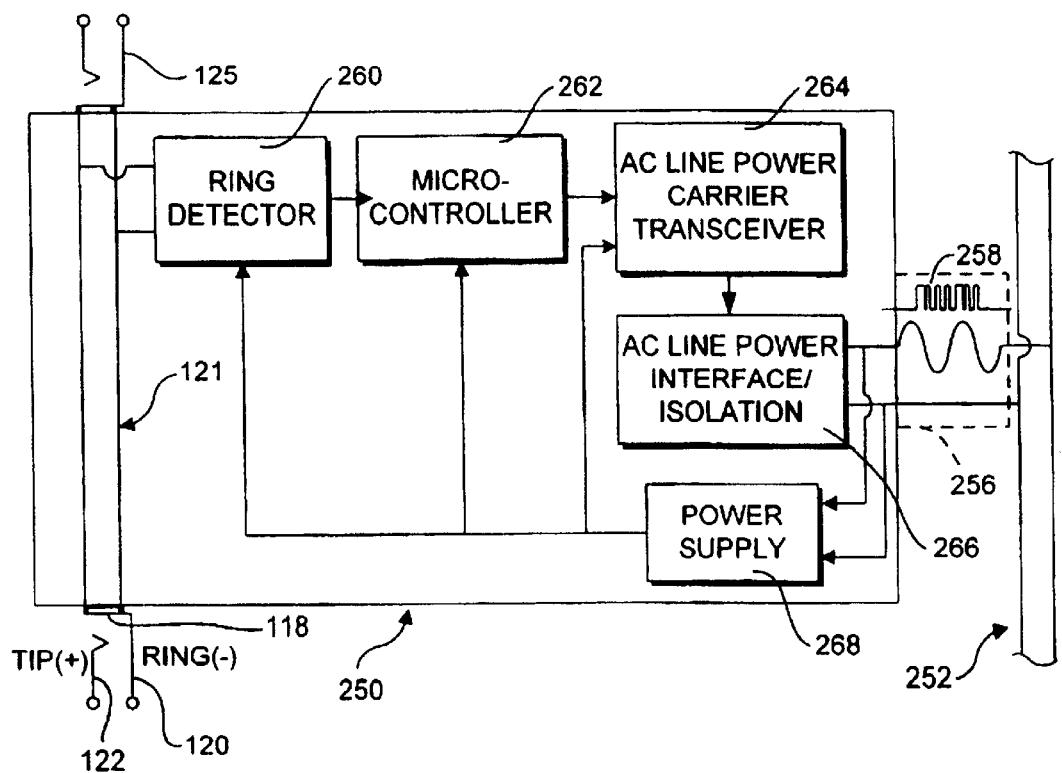
FIG. 8 is a schematic block diagram of a module for monitoring an incoming telephone ring signal and transmitting a modulated signal to a switchable power receptacle over an AC power circuit.

FIG. 8 shows a second example of a module for detecting an incoming telephone ring signal and transmitting a signal to a switchable power receptacle. In this embodiment, module 250 transmits a modulated communication signal over AC power circuit 252 to a switchable power receptacle such as is shown in FIG. 5. In FIG. 8, ring detector 260 is similar to ring detector 124 of FIG. 6. In addition to ring detector 260, module 250 includes a microcontroller 262 and an AC line power carrier transceiver 264; these components are energized by a power supply 268, which receives an input AC voltage supplied by AC power circuit 252. Module 250 further includes a power line interface/ isolation circuit 266, which is used to isolate the high voltages on AC power circuit 252 from the other internal circuitry of module 250. Ring detector 260 produces a logic level signal that is input to microcontroller 262 when a ringing signal is present on telephone line 125. In response to the indication of a ringing signal being detected, producing a change in the logic level signal input to microcontroller 262, microcontroller 262 generates a communication signal that is input to AC line power carrier transceiver 264. AC line power carrier transceiver 264 produces modulated signal 258 for transmission over AC power circuit 252. A suitable AC line power transceiver comprises an SGS-Thompson Company, Type ST7537 CFN power line modem, which is packaged as a 20-pin IC, although other suitable devices may instead be used. Modulated signal 258 is carried over AC power circuit 252 and can be detected by a switchable power receptacle that is connected to AC power circuit 252, such as the type shown in FIG. 5.

Figure 9:
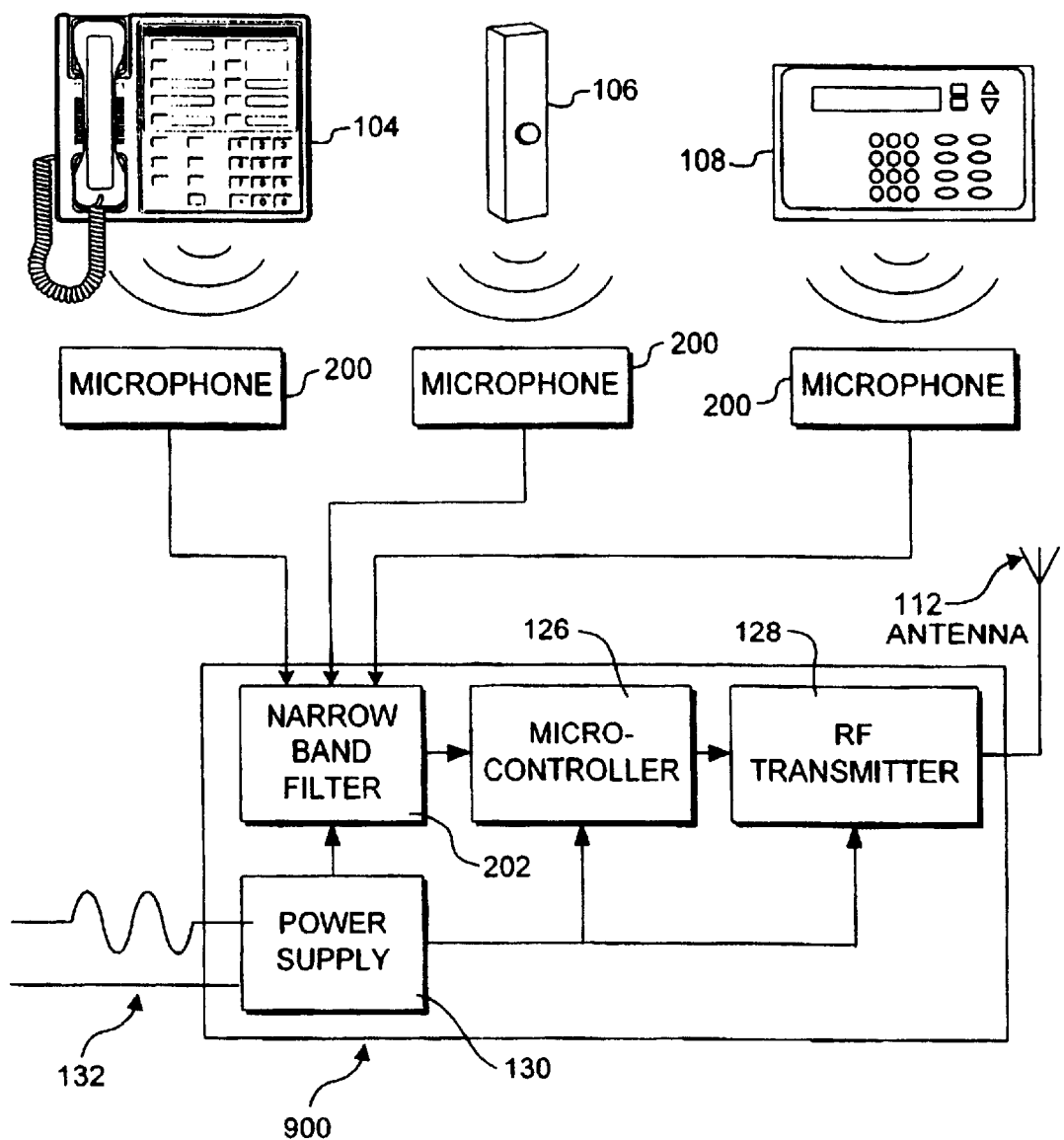
FIG. 9 is a schematic block diagram of an alternative embodiment, wherein a plurality of microphones are placed in proximity to respective audible signal sources to detect audible signals corresponding to a plurality of predetermined awareness conditions.

The embodiment shown in FIG. 9 incorporates several other possible variations. In this embodiment, inputs from multiple sensing means (represented by microphones 200) are supplied to a module 900 that contains narrow band filter 202, microcontroller 126, RF transmitter 128 and power supply 130. Upon detection of an awareness condition by any of microphones 200, RF transmitter 128 is activated to send a signal via antenna 112 to one or more switchable power receptacles. In the embodiment shown, microcontroller 126 and power supply 132 perform the functions described for them with respect to FIGS. 5, 6 and 8. The embodiment shown in FIG. 9 includes an optional but preferred feature, narrow band filter 202, which permits a narrow, preselected range of frequencies, (i.e., a band pass frequency range) to pass through from any of microphones 200 to the microcontroller while other frequencies outside the band pass range are blocked. This permits module 900 to respond to certain preselected sounds, (such as, for example, a telephone ring, a doorbell, an alarm, a voice, etc.) while ignoring other sounds such as extraneous environmental noises. In the embodiment shown, narrow band pass filter 202 includes circuitry that produces a logic level signal in response to the detection of the sound being monitored by any of microphones. Upon detection of a sound by the narrow band pass filter, the logic level of its output signal changes state, causing microcontroller 126 to command RF transmitter 128 to generate a radio frequency signal and transmit it to a switchable power receptacle. Note that in the embodiment shown in FIG. 9, a common narrow band filter is used for all of microphones 200. An alternative arrangement would be to include a separate narrow band filter for each microphone.

Each of microphones 200 is located in an area in which the existence of an audible awareness condition is to be monitored, such as, for example, near telephone 104, the chime of doorbell 106 or alarm system 108. In FIG. 9, telephone 104, doorbell 106 and alarm system 108 are merely representative of the many types of audible awareness conditions that might be detected with module 100. Module 900 can be located at any convenient place and does not need to be physically proximate to any of microphones 200, provided that a signal from microphones 200 can be received by module 900. Thus, module 900 can act as a central operating module through which multiple sensing means and switchable power receptacles can be operated. A more detailed description of such a central operating module is discussed below.

Note that several methods can be employed to send a signal from any of microphones 200 to module 900. Microphones 200 can be wired to module 900, or any of the wireless methods discussed above for transmitting a signal, such as a RF (radio frequency) transmitter/receiver, an AC line power carrier transceiver, ultrasound transmitter/ receiver, infrared or visible light transmitter/receiver, microwave transmitter/receiver, and the like can be used.

Although the invention is illustrated in FIG. 9 with microphones as the sensing means, any other sensing means as discussed before can be substituted for the microphones in the embodiment shown in FIG. 9.

Figure 10:
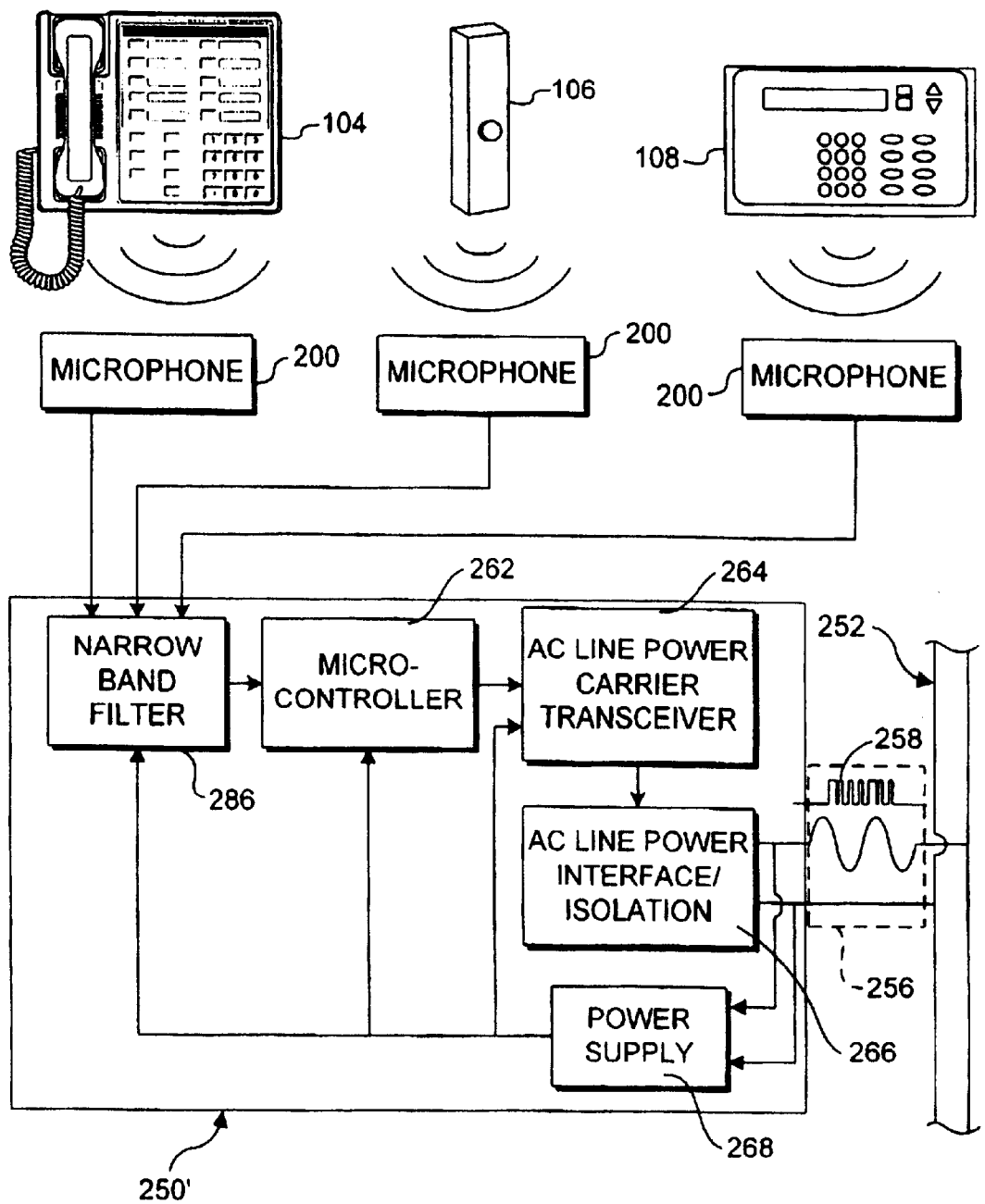
FIG. 10 is a schematic block diagram of an alternative embodiment, wherein a plurality of microphones are placed in proximity to corresponding audio sources module and a signal is transmitted over an AC power circuit.

FIG. 10 illustrates a variation of a module in which the sensing means is a sound detector and the transmitter is an AC line power carrier transceiver. Module 250' contains or is connected to one or more microphones 200 that are located in one or more areas in which the existence of an audible awareness condition is to be monitored, such as, for example, near telephone 104, the chime of doorbell 106 or alarm system 108. In this configuration, module 250' includes a narrow band pass filter 286 that performs the same function as narrow band pass filter 202 discussed above with regard to FIG. 9. The rest of module 250' contains circuitry similar to and performing the same function as that described in FIG. 8. Narrow band pass filter 286 provides a control input signal to microcontroller 262 when a signal produced by one of the microphones 200 meets the band pass parameters of filter 286. The control input signal causes microcontroller 262 to send a signal via AC line power carrier transceiver 262 over AC power circuit 252 to a switchable power receptacle of the type shown in FIG. 5, that is connected to the same AC power circuit 252.

Figure 11:
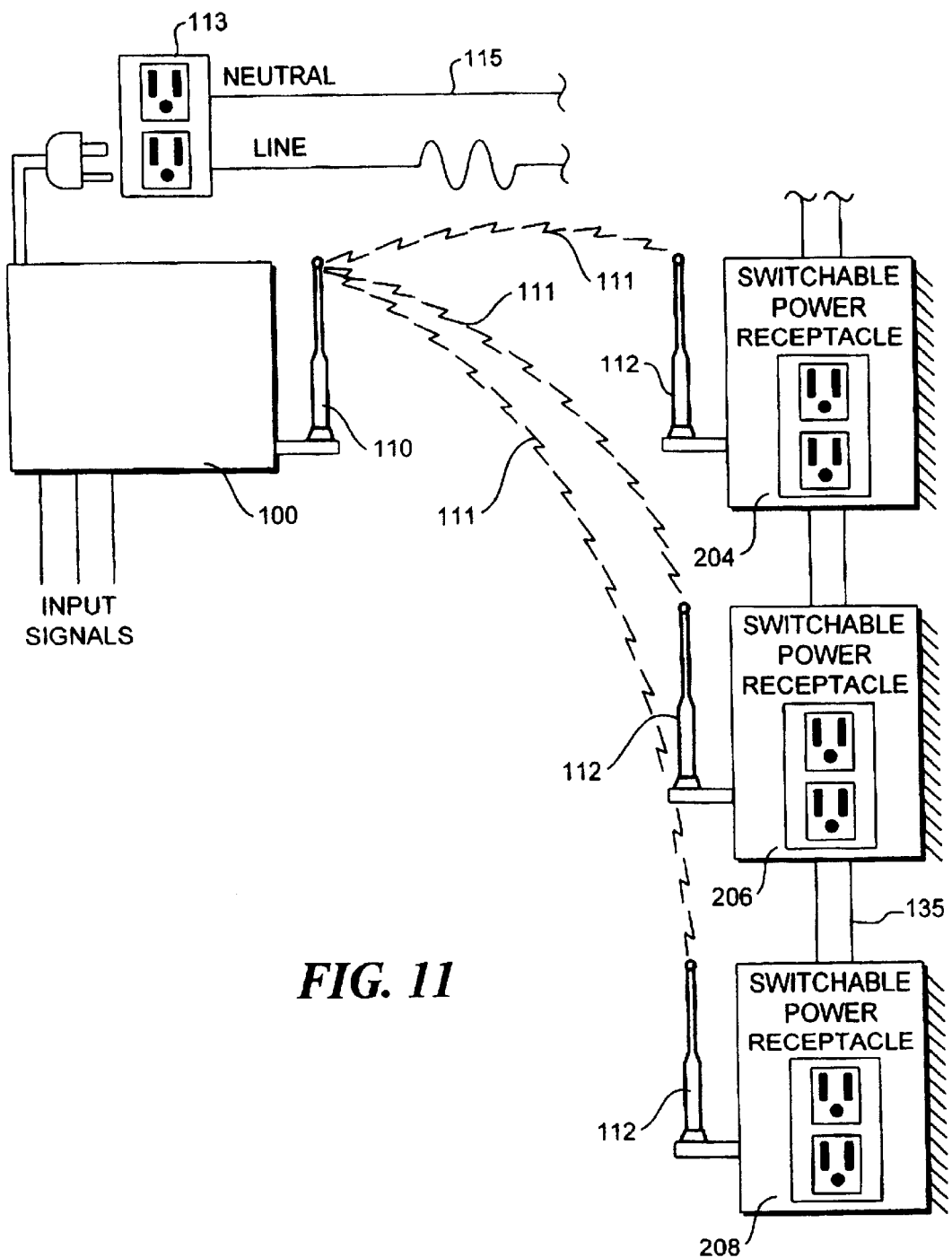
FIG. 11 is a schematic block diagram of an embodiment of the invention, illustrating a plurality of switchable electrical receptacles that are controlled by a single control module.
Figure 12:
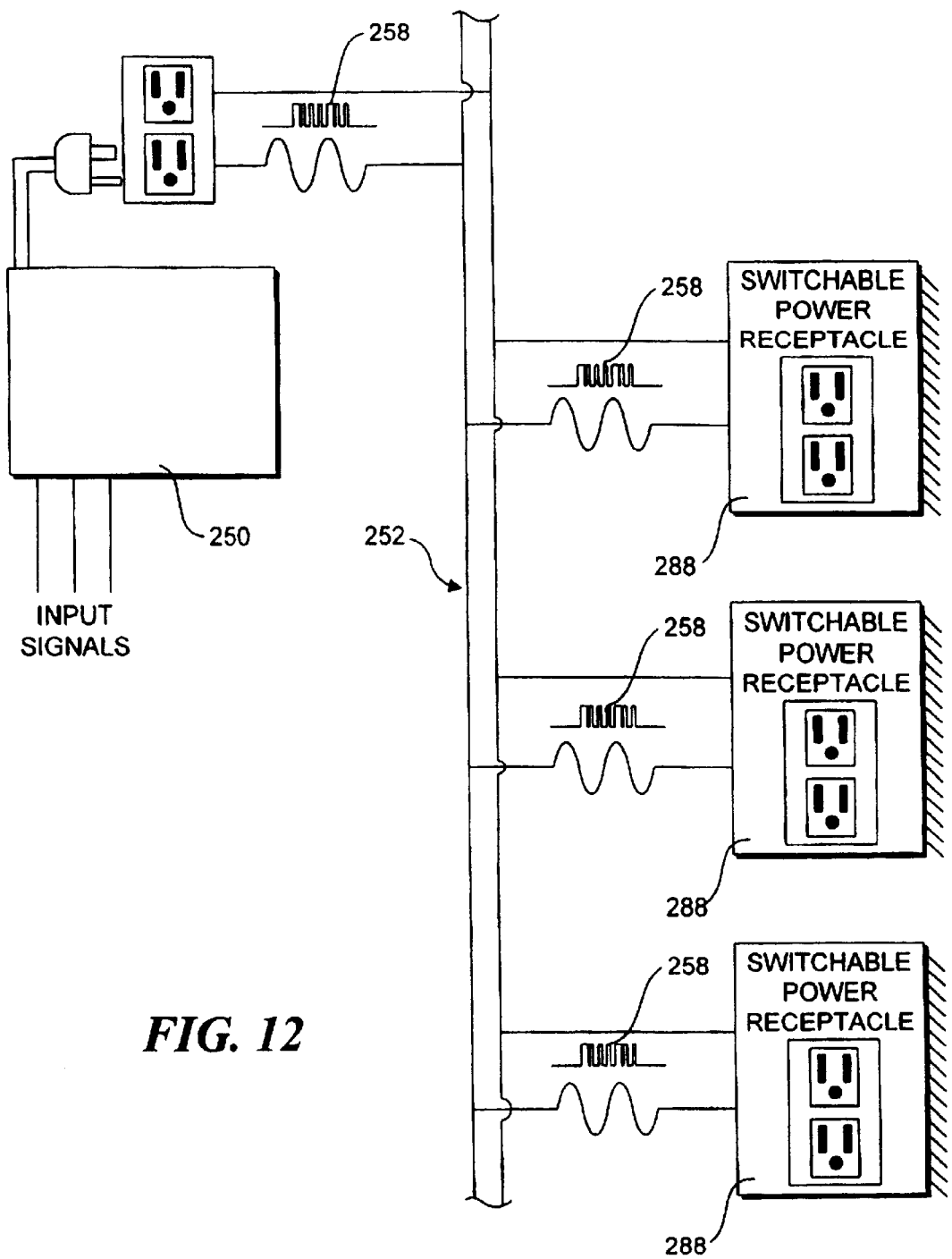
FIG. 12 is a schematic block diagram of a configuration used in the second exemplary embodiment in which a plurality of switchable electrical receptacles are controlled by a single command module and a signal is transmitted over an AC power circuit.

FIGS. 11 and 12 are diagrams that illustrate how the transmitter and switchable power receptacle work together. In FIG. 11, module 100 transmits RF signals 111 via antenna 110 to switchable power receptacles 204, 206 and 208, which receive the signals through antennae 112. Module 100 contains a RF transmitter as is shown in FIGS. 6 and 9 and contains means for receiving input signals from one or more remotely located sensing means. As shown, module 100 derives its power by virtue of being plugged into outlet 113 on AC power line 115. As shown, switchable power receptacles 204, 206 and 208 are all connected to a single AC power circuit 135. However, the switchable power receptacles may be attached to different AC power circuits if desired. Note that any number of switchable power receptacles can be used with a single transmitter, and vice versa; a single switchable power receptacle can be used in conjunction with more than one transmitter.

In FIG. 12, module 250 contains an AC line power transceiver that sends a modulated signal 258 over AC power circuit 252 to switchable power receptacles 288. Each switchable power receptacle 288 contains an AC line power transceiver and related circuitry of the type shown in FIGS. 5, 8 and 10.

It will be readily appreciated that many variations of the transmitter and the switchable power receptacle can be made, and that each can be combined with additional components to provide more specialized functions. For example, the transmitter may be incorporated directly into another electronic device that creates the awareness condition being monitored. Thus, the transmitter can be built into a telephone set, burglar, fire and/or smoke alarm system, doorbell circuitry, an alarm clock, or any other device. Alternately, the sensing means can be built into such a device. Further, the sensing means can be modified to cause the electronic device to repeat the awareness condition. For example, a doorbell or alarm could be caused to re-activate after the switchable power receptacle is activated to an "off" position, so that the bell or alarm can be heard, and the particular awareness condition identified.

Figure 13:
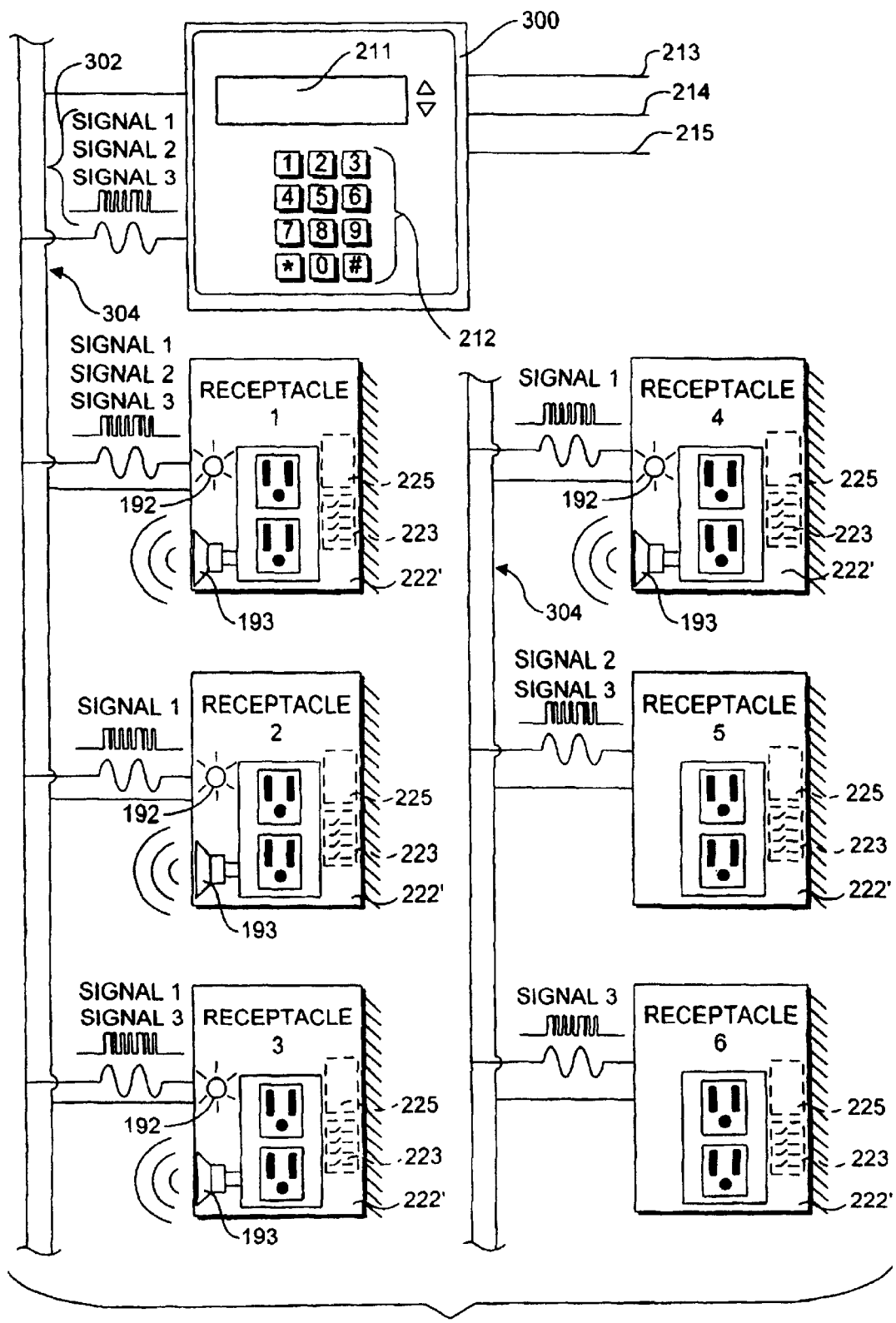
FIG. 13 is a schematic block diagram of a system configuration in the second exemplary embodiment, showing a control panel that receives a plurality of input signals and send a signal to a plurality of switchable electrical receptacles over an AC power circuit.

In another variation, one or more sensing means can communicate with a central control panel containing a transmitter. The central control panel then relays a signal to one or more switchable power receptacles. An example of such a configuration is shown in FIG. 13. Control panel 300 has a display 211 and an alphanumeric keypad 212 (note that the letters on each key of the keypad are not shown in the Figure). It also contains a transmitter that is adapted to create a plurality of different control signals (1, 2, or 3) and send them on demand to one or more switchable power receptacles 222'. As shown, control panel 300 is adapted to receive inputs from multiple remote sensing means that can detect the existence of an awareness condition. In FIG. 13, the inputs are represented by an incoming telephone call 213, the operation of doorbell 214 and the activation of a security alarm 215. When an awareness condition exists, one or more remote sensing means sends a corresponding logic level signal indicative of the awareness condition to control panel 300. Control panel 300 contains internal programming that permits it to generate a generate and transmit a particular signal, i.e. one of signal 1, signal 2 or signal 3, to one or more of the switchable power receptacles 222' in response to receiving an input indicating the existence of a particular awareness condition. For example, the user may set control panel 300 to produce signal 1 in response to the telephone, signal 2 in response to a doorbell and signal 3 in response to the security alarm. Signals 1–3 are transmitted to switchable power receptacles 222, which are labeled 1–6. In the embodiment shown, transmission is effected via a modulated signal sent through an AC power circuit, but as discussed before any suitable transmission method can be used. Each of the switchable power receptacles is adapted to respond to one or more of signals 1–3. This can be done, for instance, through use of a programmable microcontroller within each of switchable power receptacles 222', or by designing or configuring its receiving means so that it responds to only certain of signals 1–3. In this way, any of switchable power receptacles are adapted to respond only to certain, prespecified awareness conditions. For instance, switchable power receptacle 1 can be set to respond (i.e., to be activated by) to any of signals 1, 2, and 3, while electrical receptacles 2 and 4 are set to only respond to signal 1. The switchable power receptacles can thus be designed to respond to signals that are transmitted in response to only some awareness conditions, while ignoring all other signals.

As discussed above, the switchable power receptacles may be configured to include an LED 192 and/or a speaker 193 for providing a visual and/or an audible indication that an awareness condition that does not produce a corresponding audible signal, such as a silent alarm, has occurred. Switchable power receptacles 1–4, each of which is programmed to respond to signal 1 are shown in FIG. 13 with this optional configuration, while receptacles 5 and 6 are shown without this option, since switchable power receptacles 5 and 6 are not programmed to respond to signal 1.

It is anticipated that switchable power receptacles 222' may be programmable, which can be accomplished through one of many techniques. According to a first method, a control signal can be sent from the control panel and received by a selected switchable power receptacle 222'. In this method, each of the switchable power receptacles have their own unique internal identification code, e.g., one of the numbers 1–6. The identities of the various switchable power receptacles that have been selected for programming to respond to a specific signal by the control panel can be indicated on display 211. The user can then select the signal(s) to which the displayed switchable power receptacles are to respond by using alphanumeric keypad 212 to enter the selected signal number(s). After the appropriate signals are entered and appear on the display, the control panel will send a signal to the switchable power receptacles identified by the displayed numbers, causing the selected signal(s) to be stored in a non-volatile static memory component 225, e.g., an SRAM chip, of the chosen switchable power receptacle(s).

In an alternative method, each switchable power receptacle can include a user settable binary switch, such as a set of digi-switches 223 (e.g., a block of DIP switches) or other form of switch (neither shown). In this method, a binary control value is set on digi-switches 223 or other type of switch by the user so that the incoming signal(s) to which the switchable power receptacle is to respond are selected. For example, each digi-switch position or each position on the other type of switch that is used may correspond to a different combination of selected signals, or a separate digi-switch or other type of switch may be provided for each possible signal to which a switchable power receptacle may respond.

The sensing means used with the embodiment shown in FIG. 13 can be like those shown in FIGS. 6, 8 and 9, among others. The sensing means monitor the existence of awareness conditions including a telephone input (represented by line 213), a doorbell circuit (represented by line 214) and a silent security alarm input (represented by line 216) The actual narrow band filtering circuitry, ring-detection circuitry, or other detection circuitry corresponding to each of the inputs may be disposed within control panel 300, or optionally, such detection circuitry may be disposed external to the control panel, perhaps adjacent to or incorporated into the monitored awareness condition producing device.

Figure 14:
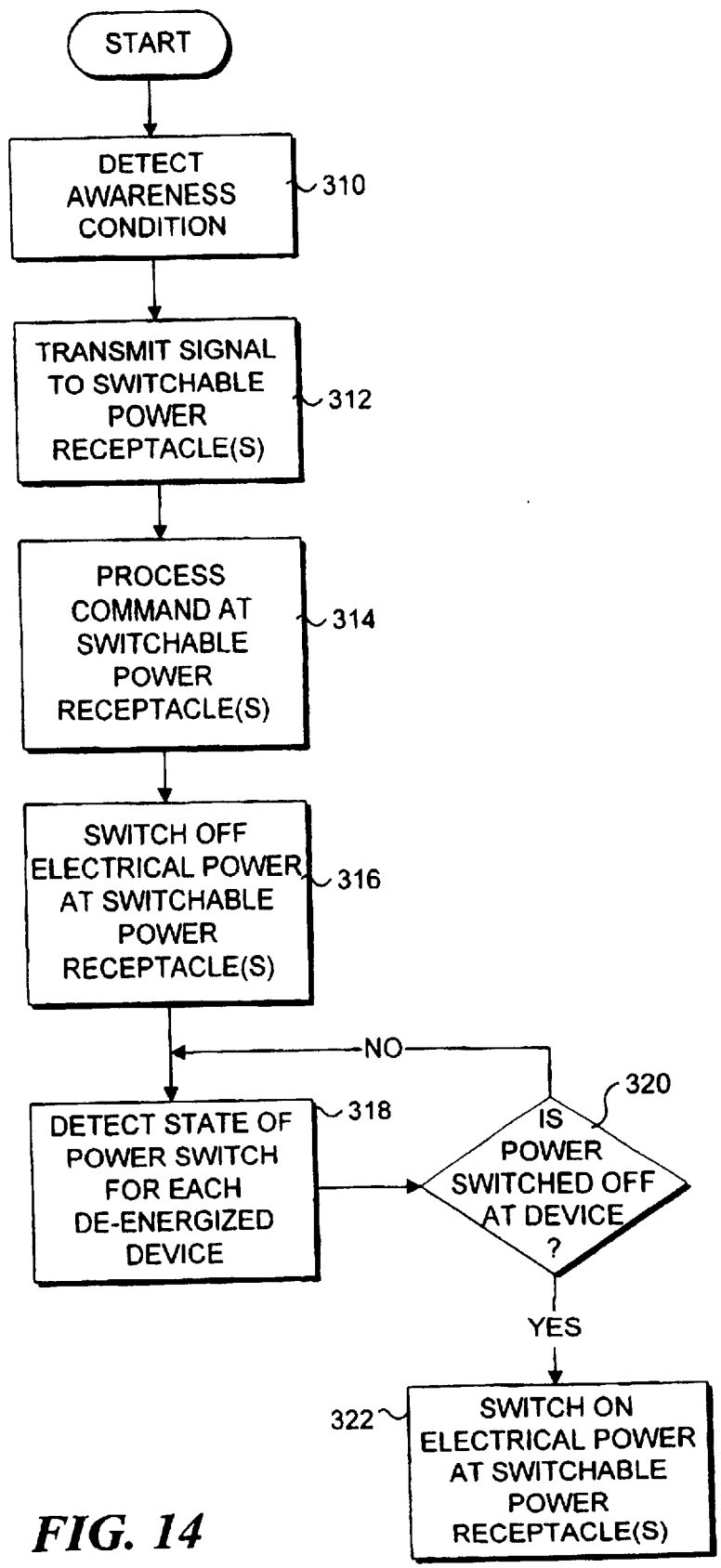
FIG. 14 is a logic diagram illustrating the steps implemented when disabling operation of an electrically powered device in response to a predetermined awareness condition.

A logical process used by the foregoing exemplary preferred embodiments will now be described with reference to FIG. 14. After the process starts, a block 310 indicates that the sensing means detects that a predetermined awareness condition has occurred, such as an incoming telephone call, a doorbell ringing to indicate a guest at the door, or activation of a silent alarm to indicate an intrusion. Upon detection of such an awareness condition, the transmitter sends a signal to one or more switchable power receptacles in accord with a block 312. As discussed above, the signal can be transmitted in various ways, including a RF signal transmitted between the antennae or a modulated signal that is conveyed over an AC power circuit.

In block 314, the signal is received and processed at the switchable power receptacle(s), causing electrical power to each appropriate receptacle to be switched off, as indicated in block 316, thereby deactivating any electrically powered devices connected to the switchable power receptacle(s). In block 318, the open or closed state of the power switch of each device that is connected to a switchable power receptacle is detected via the load sense circuit, as discussed above with reference to FIG. 4A.

A decision block 320 determines if the power switch of the electrically powered device has been switched off. If so, the power is switched on at the appropriate switchable power receptacle in a block 322 so that the device connected to the switchable power receptacle that has been turned off locally at the power switch of the device can be re-energized by turning the device's power switch back to the on position. Now, when the user again switches on the power switch on the device, the device will again be energized. These steps prevent the device from turning on unexpectedly, as might occur if the switchable power device were to turn on the power to the device when the power switch on the device were still in the on position. Thus, a user can cause the switchable power receptacle to again supply electrical power to the device by briefly turning the power switch of the device off and then on.

Figure 15:
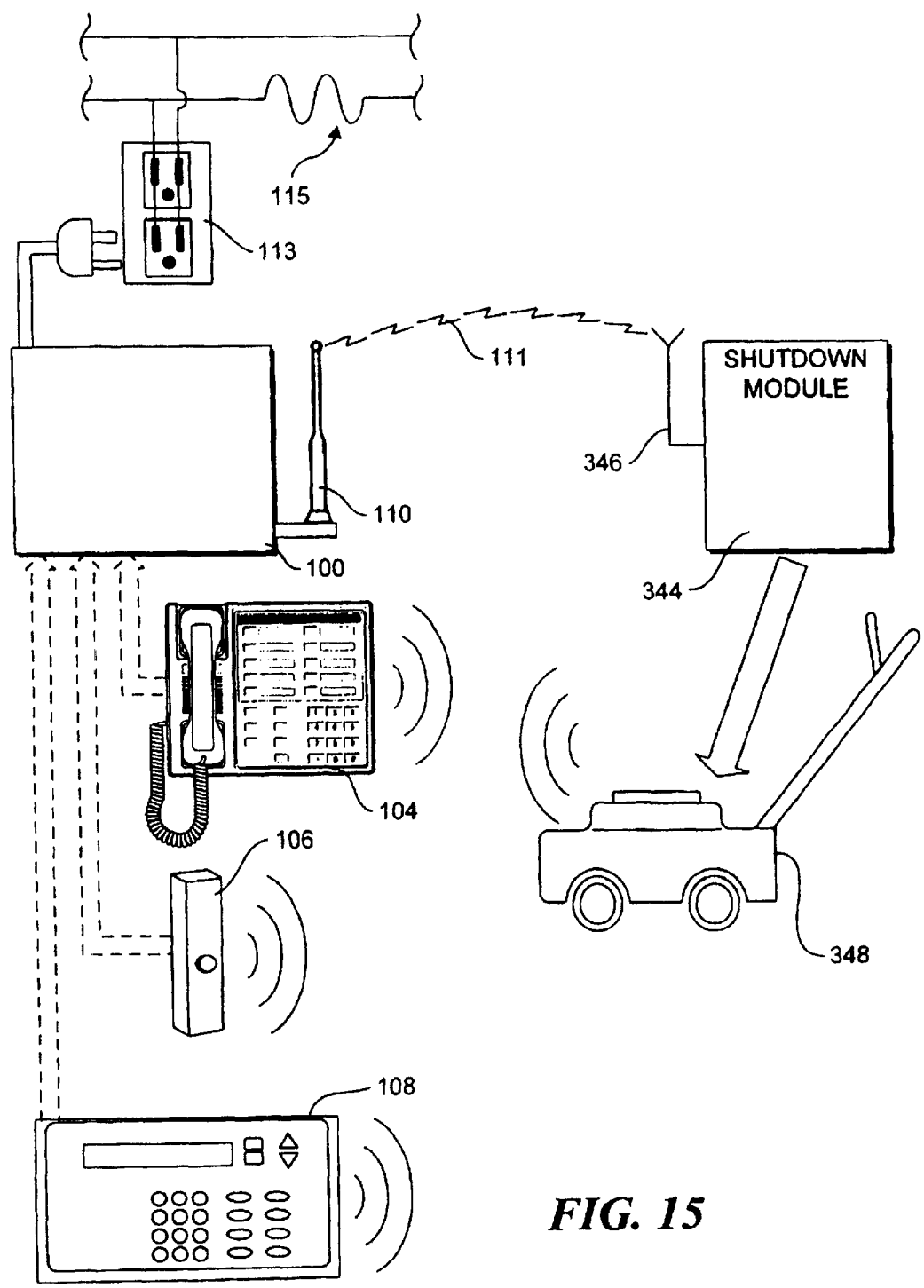
FIG. 15 is a schematic block diagram of a third exemplary preferred embodiment of the present invention.

In addition to shutting off power to electrically-powered devices, the present invention can also be used to shut off devices that are powered by internal combustion engines, such as lawnmowers, chain saws, leaf blowers, weed whackers, etc. As shown in FIG. 15, module 100 transmits a RF shutdown signal 111 after detecting an awareness condition, and the shutdown signal is received by a shutdown module 344 via an antenna 346. The shutdown module is attached to a device 348 such as lawnmower that is powered by an internal combustion engine, and disables operation of the engine in response to the RF shutdown signal.

In most instances, the internal combustion engine will include a magneto-based ignition system that produces a high voltage to fire the engine's spark plug(s) when the magneto is rotated by the engine, thereby causing internal combustion within the engine. There are two ways to shut down engines that use magneto ignition systems: (1) ground (or reduce) the output of the magneto so that the spark plug(s) no longer receive an adequate firing voltage to ignite a fuel/air mixture; or (2) retard (or block) the fuel flow to the engine until the fuel-to-air ratio is so low that combustion cannot occur. Generally, the first method is preferable; however, in other instances, it may be necessary to use the second method, as will be the case with most diesel engines.

Figure 16:
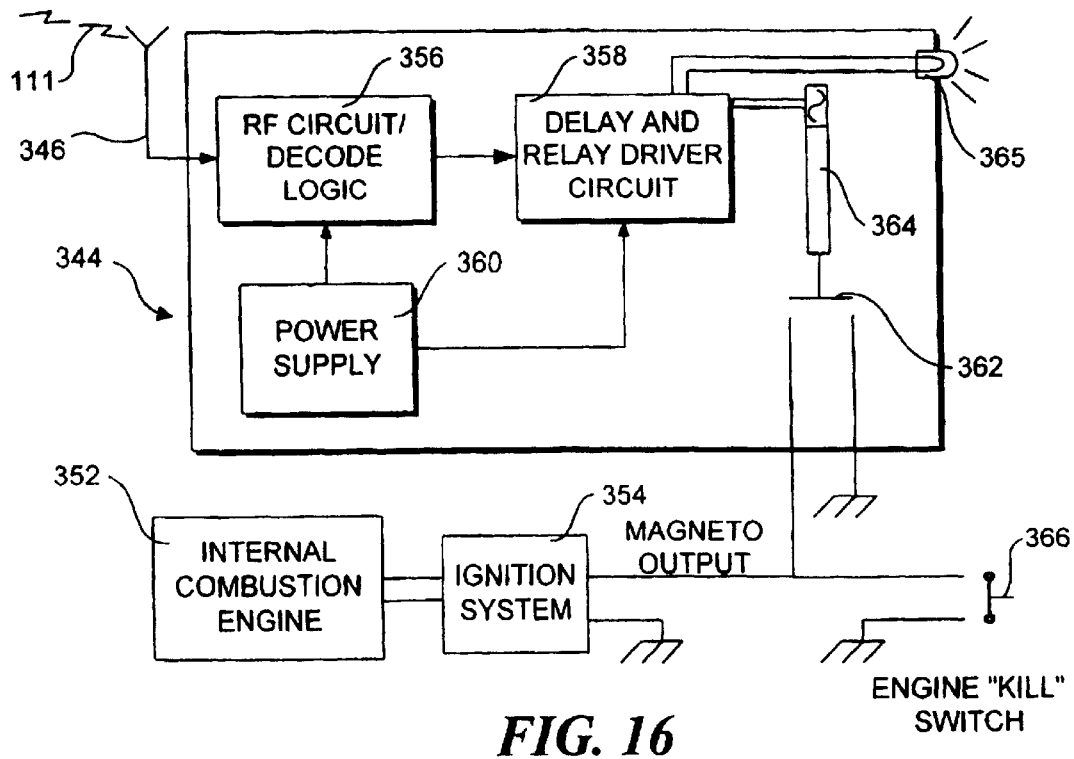
FIG. 16 is a schematic block diagram of a shutdown module that is used in the third exemplary embodiment for disabling operation of an engine's ignition system.

A schematic block diagram of a first configuration of shutdown module 344 is shown in FIG. 16. In this configuration, the shutdown module is used to temporarily disable operation of an internal combustion engine 352 by grounding the magneto output of ignition system 354, thereby preventing a spark from being delivered to the internal combustion engine.

Shutoff module 344 includes antenna 346, a RF circuit with decode logic 356, and a delay and relay driver circuit 358, the latter two of which are energized by a power supply 360. In most instances, power supply 360 will include a replaceable battery, such as a 9 volt battery or a plurality of 1.5 volt batteries, and a conditioning circuitry to provide a regulated voltage supply (e.g., at 3.3 or 5 volts) to circuits 356 and 358. In instances wherein the engine-powered device includes a battery, that battery can instead be used to supply electrical current to the power supply.

The RF circuit of the shutoff module detects a control signal 111 that is transmitted by module 100 (FIG. 15), and. received by antenna 346. Upon receiving this control signal, the RF circuit causes the delay and relay circuit to shut down the engine. The engine is shut down when contacts 362 of a normally-open relay 364 close, thereby shorting the magneto output voltage of an ignition system 354 to chassis ground. Preferably, in conjunction with this event, a visual indication is provided by lighting an LED 365 (or other light source) to inform the operator of the device that the engine stopped running because it was shutdown by the shutdown module, rather than because it ran out of fuel or had an electrical or mechanical failure.

Most devices that employ small internal combustion engines, such as lawnmowers, leaf blowers, etc., provide a "kill" switch 366 that is used to stop the engine by grounding output of the magneto. For the following discussion, it is presumed that switch 366 is switched to its "on" position, thereby enabling operation of the engine.

Figure 17:
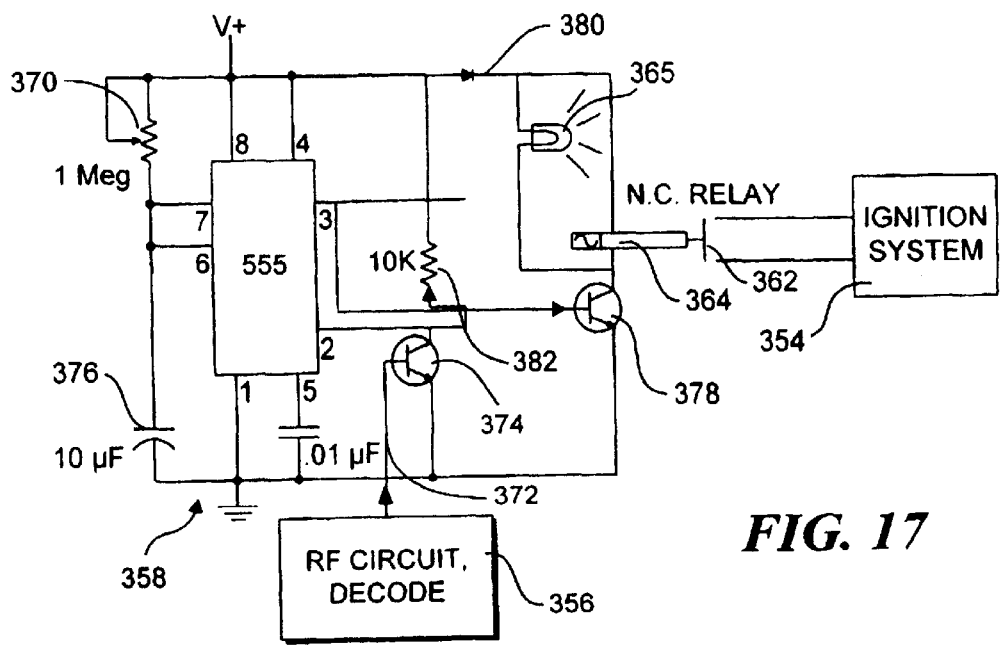
FIG. 17 is a detailed schematic diagram of a delay and relay driver circuit used in the shutdown module of FIG. 16.

Details of a suitable delay and relay driver circuit 358 are shown in FIG. 17. The circuit comprises a Type 555 timer IC, which is used to temporarily close contacts 362 of normally-closed relay 364 for a controlled time period that can be adjusted with a potentiometer 370. The circuit receives an input signal on a line 372 from RF circuit 356, which is preferably in the form of a high logic level pulse. Line 372 is connected to the base terminal of an NPN transistor 374, and the signal applied to the base terminal causes the transistor's collector to sink current, thereby pulling the logic level on pin 2 of the 555 timer IC to low. When pin 2 is pulled low, a single "shot" output signal is generated on pin 3 and is maintained at a high logic level for a time period that is dependent on the RC circuit comprising resistance of potentiometer 370 and capacitance of a capacitor 376. Preferably, the time period should be approximately 5–10 seconds. The single shot signal is received as an input to the base terminal of an NPN transistor 378, which in response, enables current to flow through the winding of normally-open relay 364 while the logic level on pin three remains high, thereby closing contacts 362 and shutting down engine 352. At the same time, current is enabled to flow through LED 365, thereby causing the LED to emit light. After the preferred 5–10 second shutdown period, the output signal on pin 3 will return to a low logic level, removing the path to ground through transistor 378, thereby de-energizing normally-open relay 364 and opening contacts 362. The removal of the short to chassis ground enables engine 352 to be restarted and operated in its normal manner. In an optional configuration (not shown), an additional transistor controlled by a flip-flop circuit is connected to LED 365 such that LED 365 remains lighted until the engine is restarted, or a separate timer circuit can be used to keep LED 365 lighted for a greater length of time than the 5–10 second shutdown period, thereby providing a better opportunity for the operator to be alerted that the engine was shutdown by the shutdown module.

It will be understood that a similar electrical circuit can be used for ignition systems that include a control switch that is configured so that when the control switch is switched to the off position, an open circuit for the ignition system primary is created. In these instances, a normally-closed relay would be used in place of normally-open relay 362.

Figure 18:
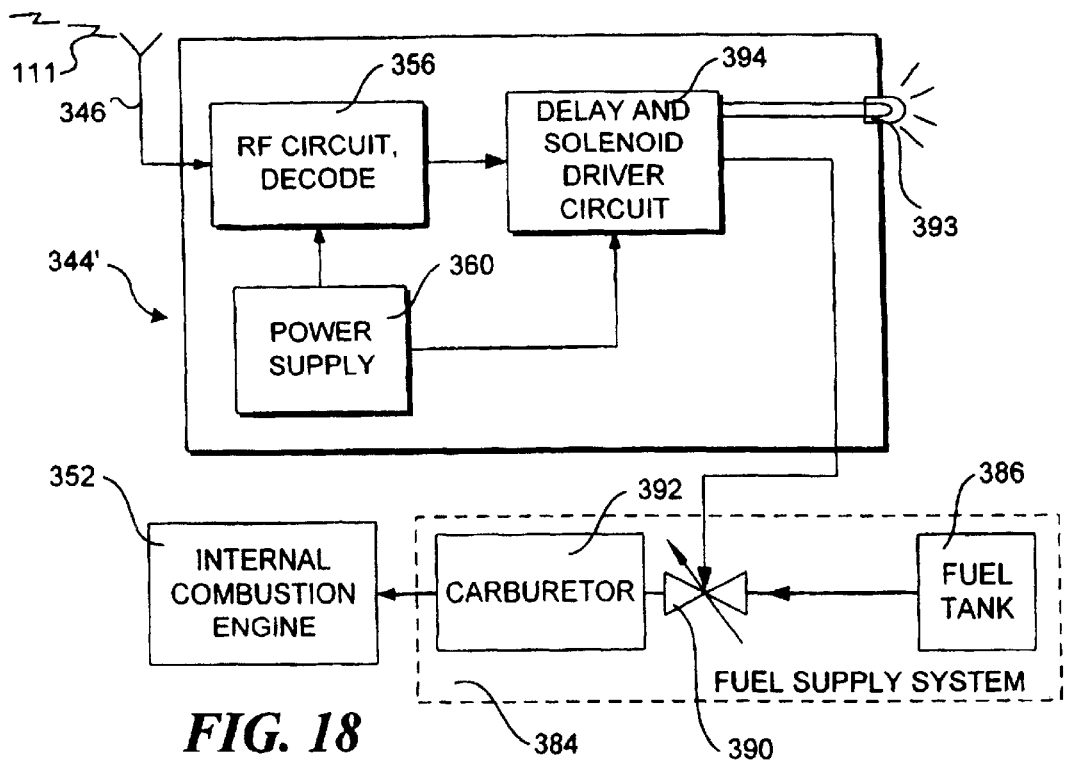
FIG. 18 is a schematic block diagram of a shutdown module that is used in an alternative configuration of the third exemplary embodiment for disabling operation of an engine's fuel supply system.

A schematic block diagram of a second configuration of the shutdown module (labeled 344') is shown in FIG. 18. In this configuration, the shutdown module is used to temporarily disable operation of internal combustion engine 352 by preventing an adequate fuel flow from reaching the engine's cylinder(s) (not separately shown). Internal combustion engine 352 is provided with a regulated supply of fuel by a fuel-supply system 384, which includes a fuel tank 386, a solenoid-activated valve 390, and a carburetor 392. Optionally, the fuel supply system can include a fuel pump, and/or the carburetor may be replaced with a fuel-injection system (not shown). Antenna 346, RF circuit 356, and power supply 360 are the same as discussed above with reference to shutdown module 344. Preferably, shutdown module 344' further includes an LED 393, which indicates when the shutdown module has disabled operation of the engine, in a manner similar to that discussed above with reference to LED 365 of shutdown module 344 (in FIG. 16).

Figure 19:
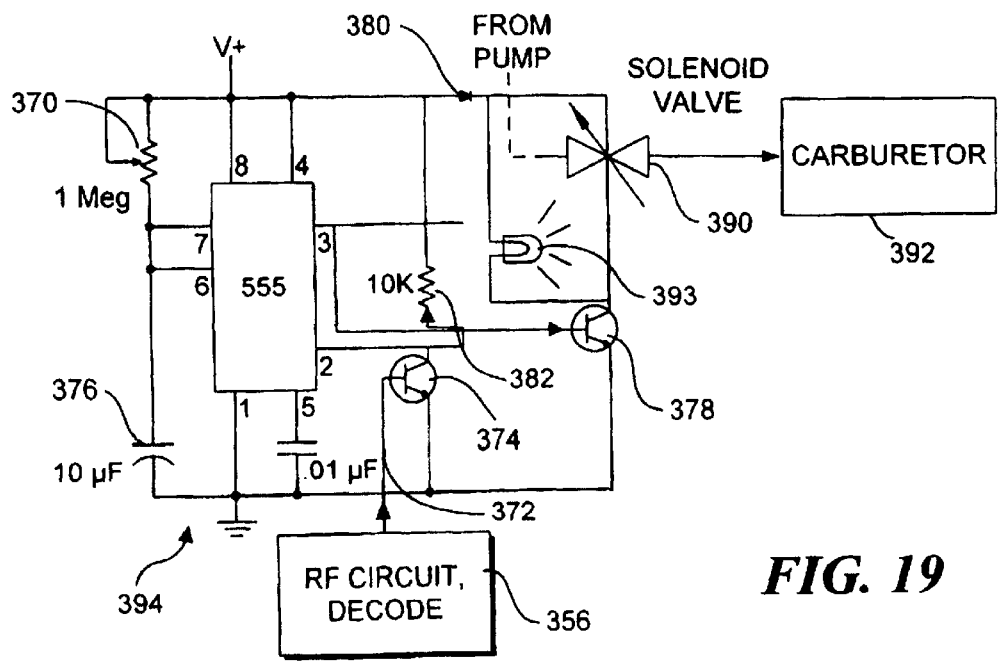
FIG. 19 is a detailed schematic diagram of a delay and solenoid driver circuit used in the shutdown module of FIG. 18.

Upon receiving and decoding the shutdown signal, RF circuit 356 provides a logic-level signal to a delay and solenoid driver circuit 394, which then closes valve 390 for an adjustable time interval, thereby starving the engine by preventing fuel from flowing into carburetor 392. As shown in FIG. 19, delay and solenoid driver circuit 394 comprises essentially the same elements and configuration as delay and relay driver circuit 358 (FIG. 17), except that the circuit is now used to drive a solenoid-activated valve instead of a normally-open relay. Preferably, in addition to shutting off the fuel supply, the circuit will also energize LED 393 in a manner similar to that discussed above, including optional configurations in which LED 393 continues to be energized for some time after the 5–10 second shutdown period has lapsed.

Figure 20:
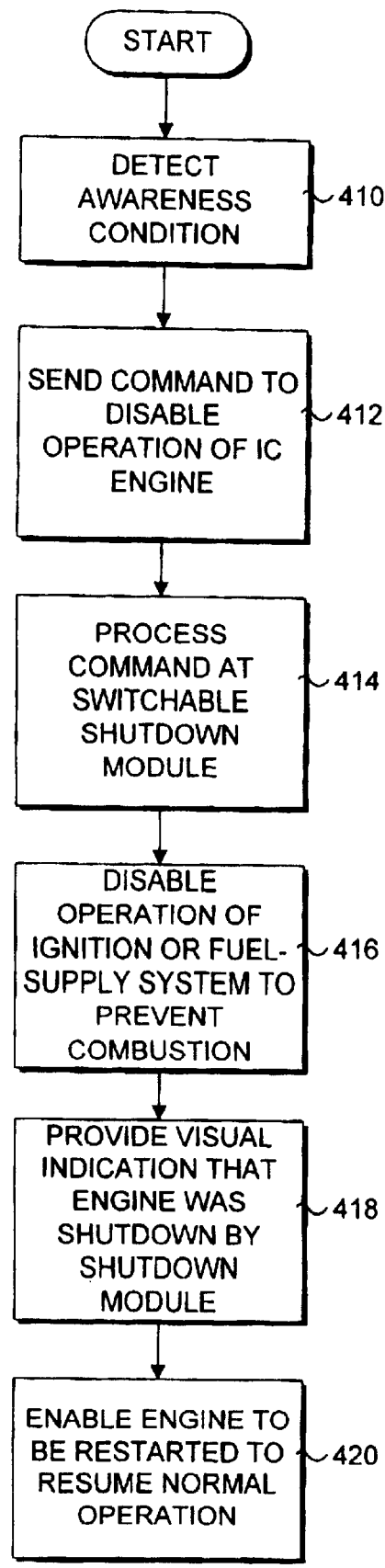
FIG. 20 is a logic diagram illustrating the steps implemented when disabling operation of a device powered by an internal combustion engine in response to a predetermined awareness condition.

A logical process used by the third exemplary embodiments to disable operation of an internal combustion engine-powered device will now be described, with reference to FIG. 20. After the process starts, block 410 indicates that a sensing means detects that a predetermined awareness condition has occurred, such as an incoming telephone call, a doorbell ringing, or an activation of a silent alarm. Upon detection of such an awareness condition, a signal is transmitted to disable operation of the engine in accord with a block 412.

In a block 414, the signal is received and processed at the shutdown module, and in response, the shutdown module temporarily disables the operation of either the engine's ignition system or fuel-supply system to stop the engine, as indicated in a block 416. Preferably, as in block 418, a light (such as the LED) will be energized at this time to visually indicate to an operator of the device that the engine has stopped running because it was shutdown by the shutdown module, and not because it ran out of fuel or had an electrical or mechanical failure.

By disabling operation of the engine powered device in this manner, the operator of the device will be alerted that an awareness condition has been detected, enabling the operator to respond appropriately. After responding to the awareness condition, the engine can then be restarted and normal operation resumed, as shown in a block 420.

Although the present invention has been described in connection with the foregoing exemplary embodiments corresponding to a preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

What is claimed is:

1. An apparatus comprising
   (a) a transmitter for sending a signal directly or indirectly to a switchable power receptacle in response to the occurrence of a predetermined awareness condition, said transmitter including at least one of (i) sensing means for sensing the occurrence of at least one predetermined awareness condition or (ii) input means for receiving an input from such a sensing means and
   (b) at least one remote switchable power receptacle that includes (i) outlet means for receiving an electrical supply line for an electrically powered device, (ii) connection means for connecting said receptacle to an electrical power supply, said connection means being in electrical communication with said outlet means though (iii) switch means having an "on" and "off" position such that electrical power is supplied to said outlet means when said switch means is in an "on" position and electrical power to said outlet means is interrupted when said switch means is in an "off" position, and; (iv) receiving means for receiving said signal directly or indirectly from said transmitter and operating said switch means in response to said signal wherein said sensing means is a sound detector, motion detector, light detector, heat detector, smoke detector or a device that detects the operation of another electrical device or component thereof, said transmitter is a radio frequency transmitter, AC line power carrier transceiver, ultrasound transmitter, infrared or visible light transmitter or microwave transmitter, and said receiving means is correspondingly a radio frequency receiver, an AC line power carrier transceiver, an ultrasound receiver, an infrared or visible light receiver or a microwave receiver.

2. The apparatus of claim 1, wherein said sensing means includes a microphone.

3. The apparatus of claim 1, wherein said transmitter includes multiple sensing means or input means for receiving inputs from multiple sensing means.

4. The apparatus of claim 1, wherein said sensing means includes a telephone ring detector.

5. The apparatus of claim 1, wherein said transmitter is a radio frequency transmitter and said receiving means is a radio frequency receiver.

6. The apparatus of claim 1, wherein said transmitter and said receiver are each an AC line power carrier transceiver.

7. The apparatus of claim 1, wherein said switchable power receptacle is such that when actuated to an "off"

position in response to a signal from said transmitter, said switchable power receptacle remains in said "off" position until some affirmative step is performed to restore said switchable power receptacle to the "on" position.

8. The apparatus of claim 7, wherein said switchable power receptacle includes a load sense circuit that prevents said switchable power from switching to an "on" position after being activated to the "off" position when an electrical load exists across said outlet means.

9. The apparatus of claim 1, wherein said transmitter includes a processor that is programmed to respond to a signal produced by a sensing means in response to the occurrence of an awareness condition.

10. The apparatus of claim 1, wherein said switchable power receptacle further includes a means to provide a visual and/or audible cue upon the occurrence of an awareness condition.

11. The apparatus of claim 10, wherein said means to provide a visual and/or audible cue includes a light.

12. The apparatus of claim 10, wherein said means to provide a visual and/or audible cue includes an audible alarm.

13. The apparatus of claim 1, wherein said transmitter resides in a control panel that further comprises a display and user interface coupled to a controller for entry of data by a user.

14. The apparatus of claim 13 having at least two switchable power receptacles, wherein said transmitter is adapted to generate a plurality of distinct signals in response to different awareness conditions.

15. The apparatus of claim 14, wherein at least one of said switchable power receptacles comprises a means to set said switchable power receptacle to respond to a preselected one or more of said distinct signals.

16. The apparatus of claim 15, wherein said means to set said switchable power receptacle to respond to a preselected one or more of said distinct signals includes a non-volatile memory for storing an identification of at least one selected awareness condition.

17. The apparatus of claim 15, wherein said means to set said switchable power receptacle to respond to a preselected one or more of said distinct signals includes one or more user settable binary switches.

18. A switchable power receptacle adapted to operate in response to a signal from a remote transmitter that indicates the existence of an awareness condition, the receptacle comprising (i) outlet means for receiving an electrical supply line for an electrically powered device, (ii) connection means for connecting said receptacle to an electrical power supply, said connection means being in electrical communication with said outlet means though (iii) switch means having an "on" and "off" position such that electrical power is supplied to said outlet means when said switch means is in an "on" position and electrical power to said outlet means is interrupted when said switch means is in an "off" position, and (iv) receiving means for receiving a signal directly or indirectly from said transmitter and operating said switch means in response to said signal wherein said remote transmitter includes a sensing means selected from the group consisting of a sound detector, motion detector, light detector, heat detector, smoke detector or a device that detects the operation of another electrical device or component thereof, said remote transmitter is a radio frequency transmitter, AC line power carrier transceiver, ultrasound transmitter, infrared or visible light transmitter or microwave transmitter, and said receiving means is correspondingly a radio frequency receiver, an AC line power carrier transceiver, an ultrasound receiver, an infrared or visible light receiver or a microwave receiver.

19. An apparatus for shutting down an internal combustion engine upon detection of a predetermined awareness condition, wherein the internal combustion engine includes an ignition system and a fuel-supply system, comprising:
   (a) a transmitter for sending a signal directly or indirectly to a switchable power receptacle in response to the occurrence of said predetermined awareness condition, said transmitter including at least one of (i) sensing means for sensing the occurrence of at least one predetermined awareness condition and (ii) input means for receiving an input from such a sensing means, wherein said sensing means is a sound detector, motion detector, light detector, heat detector, smoke detector, load detector, voltage detector, current detector or telephone ring detector
   (b) a shutdown module comprising one or both of components (1)(a) and (1)(b), wherein component (1)(a) is a switch that is coupled to said ignition system and component (1)(b) is a valve that controls a flow of fuel for the said internal combustion engine, said shutdown module being switchable between a normal operation mode and a shutdown mode in which operation of the internal combustion engine is disabled, by actuating said one of the switch and the valve; and (2) receiving means for receiving said signal directly or indirectly from said transmitter and operating said switch or valve to effect said shutdown mode in response to said signal.

20. The apparatus of claim 19 wherein said shutdown module contains a switch that is coupled to said ignition system such that when said switch is activated, the ignition system is prevented form providing an adequate spark to the internal combustion engine, thereby stopping the internal combustion engine.

21. The apparatus of claim 19 wherein said shutdown module contains a valve that controls the flow of fuel for the internal combustion engine such that when said valve is actuated, the valve prevents an adequate supply of fuel from being supplied to the internal combustion engine, thereby stopping the internal combustion engine.

22. The apparatus of claim 19, wherein said transmitter is a radio frequency transmitter and said receiving means is a radio frequency receiver.

23. The apparatus of claim 19, wherein said shutdown module contains a timer that returns the shutdown module to a normal operating mode after a predetermined time period in a shutdown mode, thereby enabling the internal combustion engine to be restarted and to resume normal operation.

* * * * *